US012399270B2

(12) United States Patent
Radius et al.

(10) Patent No.: US 12,399,270 B2
(45) Date of Patent: Aug. 26, 2025

(54) DETECTING AND SUPPRESSING AMBIGUITIES IN SYNTHETIC APERTURE RADAR DATA AND IMAGES

(71) Applicant: ICEYE OY, Espoo (FI)

(72) Inventors: Andrea Radius, Espoo (FI); Pierre Leprovost, Espoo (FI)

(73) Assignee: ICEYE OY, Espoo (FI)

( * ) Notice: Subject to any disclaimer, the term of this patent is extended or adjusted under 35 U.S.C. 154(b) by 0 days.

(21) Appl. No.: 18/851,353

(22) PCT Filed: Feb. 7, 2023

(86) PCT No.: PCT/EP2023/052992
§ 371 (c)(1),
(2) Date: Sep. 26, 2024

(87) PCT Pub. No.: WO2023/186386
PCT Pub. Date: Oct. 5, 2023

(65) Prior Publication Data
US 2025/0110234 A1    Apr. 3, 2025

(30) Foreign Application Priority Data
Mar. 31, 2022  (GB) .................................. 2204681

(51) Int. Cl.
*G01S 13/90*    (2006.01)
(52) U.S. Cl.
CPC ....... *G01S 13/9011* (2013.01); *G01S 13/9021* (2019.05)
(58) Field of Classification Search
CPC ........................................ G01S 13/9004–9094
See application file for complete search history.

(56) References Cited

U.S. PATENT DOCUMENTS 4,546,354 A *  10/1985  Boles ...................... G01S 13/66
                                                      342/25 C
4,549,184 A    10/1985  Boles et al.
(Continued)

FOREIGN PATENT DOCUMENTS

CN      113176565 A      7/2021
JP      2001-108744 A    4/2001
(Continued)

OTHER PUBLICATIONS

PCT Written Opinion and Search Report issued in related PCT Patent Application No. PCT/EP2023/052992 dated May 2, 2023.
(Continued)

*Primary Examiner* — Matthew M Barker
(74) *Attorney, Agent, or Firm* — Cozen O'Connor

(57) ABSTRACT

A method of detecting and suppressing azimuth ambiguities in synthetic aperture radar (SAR) single look complex (SLC) image data (SAR SLC image data) comprising a Doppler spectrum obtained from received SAR signals by applying an amplitude threshold to the Doppler spectrum of received SAR signals to exclude amplitude values above the amplitude threshold resulting from ambiguous energy in the Doppler spectrum, and substituting the excluded amplitude values using a fitting function to generate a modified Doppler spectrum with the ambiguous energy suppressed; and generating azimuth ambiguity suppressed image data using the modified Doppler spectrum.

20 Claims, 13 Drawing Sheets

FIG. 7

(56) References Cited

U.S. PATENT DOCUMENTS

| | | | |
|---|---|---|---|
| 2018/0169063 | A1 | 6/2018 | Burks et al. |
| 2019/0072665 | A1 | 3/2019 | Wang et al. |
| 2019/0353779 | A1 | 11/2019 | Wan et al. |
| 2020/0400813 | A1* | 12/2020 | Oishi ................ G01S 13/9027 |
| 2021/0041556 | A1 | 2/2021 | Fox et al. |

FOREIGN PATENT DOCUMENTS

| | | |
|---|---|---|
| JP | 2013-181954 A | 9/2013 |
| JP | 2017161358 A | 9/2017 |
| PE | 20151428 A1 | 9/2015 |
| WO | 2021 234906 A1 | 11/2021 |

OTHER PUBLICATIONS

Great Britain Office Action issued in related Great Britain Patent Application No. GB2204681.7 dated Sep. 4, 2024.
Radius Andrea et al., "Phase Variant Analysis Algorithm for Azimuth Ambiguity Detection", 2022 IEEE Radar Conference (RadarConf22), Mar. 21, 2022, pp. 1-4.
Scheiber, Roft, et al., "Detection and Mitigation of Strong Azimuth Ambiguities in High Resolution SAR Images", EUSAR 2016 Proceedings of the 11th European Conf. on Synthetic Aperature Radar, Jun. 6, 2016, pp. 436-466.
Meng Hui, et al., "Local Azimuth Ambiguity-to-Signal Ratio Estimation Method Based on the Doppler Power Spectrum in SAR Imaging", Remote Sensing, vol. 11, No. 7, Apr. 9, 2019, p. 857.
Great Britain Office Action issued in related Great Britain Patent Application No. GB2204681.7 dated Sep. 30, 2022.
Japanese Office Action issued in related Japanese application No. 2024-557746 dated Feb. 13, 2025.

* cited by examiner

DETECTING AND SUPPRESSING AMBIGUITIES IN SYNTHETIC APERTURE RADAR DATA AND IMAGES

This application is the National Stage filing under 35 U.S.C. 371 of International Application No. PCT/EP2023/052992 filed on 7 Feb. 2023, and also claims priority to GB Application No. 2204681.7 filed on 31 Mar. 2022, the contents of both of which are hereby incorporated by reference herein in their entirety to the extent permitted by law.

FIELD OF INVENTION

The invention is in the field of synthetic aperture radar data and image processing.

BACKGROUND

A Synthetic Aperture Radar (SAR) can be used to image an area on Earth, also known as a target area, by transmitting radar beams and recording the return echoes, i.e. returned radar energy, from those transmitted beams. SAR systems can be installed on airborne platforms such as aircraft, as well as in satellites operating from space. Various modes of operating the SAR (Scanning Synthetic Aperture Radar) can be used, such as such as stripmap, spotlight, and ScanSAR (Terrain Observation with Progressive Scan SAR).

A SAR is typically carried on board a moving platform, such as a satellite, and therefore moves with respect to a target on Earth to be imaged. As the platform moves, the SAR antenna location relative to the target changes with time and the frequency of received signals changes due to the Doppler effect. Thus the received echoes have a spectrum of frequencies.

Typically, a SAR system transmits radio-frequency radiation in pulses and records the returning echoes. Data derived from the returning echoes is sampled and stored for processing in order to form an image. Ambiguities can arise in the data and the images, for example from radar echoes backscattered from points not in the main target imaging area. These ambiguities can arise because it is difficult to perfectly direct a radar beam only to the target image area. In reality, the radar beam has sidelobes that also illuminate areas outside of the desired imaging area, and result in radar echoes from these "ambiguous" areas that are then mixed in with the returns from the "unambiguous" areas. These echoes from undesired regions, which may be from previous and later transmitted pulses, can include ambiguities in both the azimuth and range directions. Ambiguities can cause an object or feature on the ground to appear in multiple positions in the image, only one of which is the true location. Even though the amplitude of some of these ambiguous signals may be smaller than the non-ambiguous signals, they can cause confusion in the image and degrade the quality of the image. As such, it would be desirable to be able to detect the ambiguities in the SAR image, as well as to be able to suppress the ambiguities.

One approach to reducing ambiguities in the first place is to design the SAR system by selecting the antenna size and the Pulse Repetition Frequency (PRF) accordingly. For example, during the phase of antenna design the azimuth ambiguity issue can be mitigated by setting the PRF properly based on the antenna length. In general an increase in the PRF reduces the occurrence of azimuth ambiguities. However, an increase in the PRF also causes more range ambiguities. As such, there are trade-offs in the design and a balance between the two types of ambiguities must be found. Unfortunately, the proper design may also not be in line with the requirements of modern SAR platforms, such as small satellites. New SAR satellite constellations are equipped with smaller antennas compared to their predecessors, imposing constraints that restrict these conventional methods of suppressing ambiguities. Since it is impossible to design a SAR system to eliminate ambiguities entirely due to the physical nature of SAR and the trade-offs involved, particularly for small SAR satellites, other approaches are being developed to detect and suppress ambiguities.

One approach is to detect and remove ambiguities through post-processing of the SAR data. For example, some algorithms have been proposed to estimate the local azimuth ambiguity-to-signal ratio (AASR). However, the existing algorithms for detecting and suppressing ambiguities are not able to suppress large ambiguities, and they can also cause a reduction of the azimuth resolution. In addition, some of the existing algorithms for ambiguity detection and suppression are based on the assumption that the ambiguous signals are located in specific areas of the signal spectrum depending on the antenna pattern. In these proposed techniques filters built based on knowledge of the antenna design are used to discriminate the ambiguous spectrum, allowing the detection and selective suppression of the ambiguities. The limitation of some of these suppression methods is a low sensitivity to weak and small ambiguities, as well as the fact that they are specific only to a particular antenna design.

Some embodiments of the invention described below solve some of these problems. However, the invention is not limited to solutions to these problems and some embodiments of the invention solve other problems.

SUMMARY

This summary is provided to introduce a selection of concepts in a simplified form that are further described below in the detailed description. This summary is not intended to identify key features or essential features of the claimed subject matter, nor is it intended to be used to determine the scope of the claimed subject matter.

There is provided in the following a method of detecting ambiguities in synthetic aperture radar (SAR) image data, and a method of suppressing ambiguities. The detection and suppression methods may be used together or separately. For example, the detection method may be used to determine the effectiveness, or quality, of an ambiguity suppression method, which may be a known method or the method described below. Conversely the suppression method may be used to improve the quality of an image after ambiguities have been detected, either by the novel method described here or by any known method.

Thus in one aspect, there is provided in the following a method of method of detecting ambiguities in synthetic aperture radar (SAR) image data wherein the SAR data comprises, for each pixel in an image, an amplitude and a phase value, the method comprising: calculating at least one phase derivative value for respective pixels represented by the SAR data with respect to a spatial direction, determining a threshold for the phase derivative value, and determining pixels with phase derivative values above the threshold to be ambiguous.

In another aspect there is provided method of suppressing azimuth ambiguities in synthetic aperture radar (SAR) single look complex (SLC) image data (SAR SLC image data), wherein the data comprises a Doppler spectrum obtained from received SAR signals, the method comprising: generating the Doppler spectrum from the SAR SLC image data, applying an amplitude threshold to the Doppler spectrum of received SAR signals to exclude amplitude values above the amplitude threshold resulting from ambiguous energy in the Doppler spectrum, and substituting the excluded amplitude values using a fitting function to generate a modified Doppler spectrum with the ambiguous energy suppressed; and generating azimuth ambiguity suppressed image data using the modified Doppler spectrum.

Embodiments of the invention also provide a computer readable medium comprising instructions, for example in the form of an algorithm, which, when implemented in a computing system forming part of a satellite operation system, cause the system to perform any of the methods described here.

Features of different aspects and embodiments of the invention may be combined as appropriate, as would be apparent to a skilled person, and may be combined with any of the aspects of the invention.

BRIEF DESCRIPTION OF THE DRAWINGS

Embodiments of the invention will be described, by way of example only and with reference to the following drawings, in which.

Figure 1:
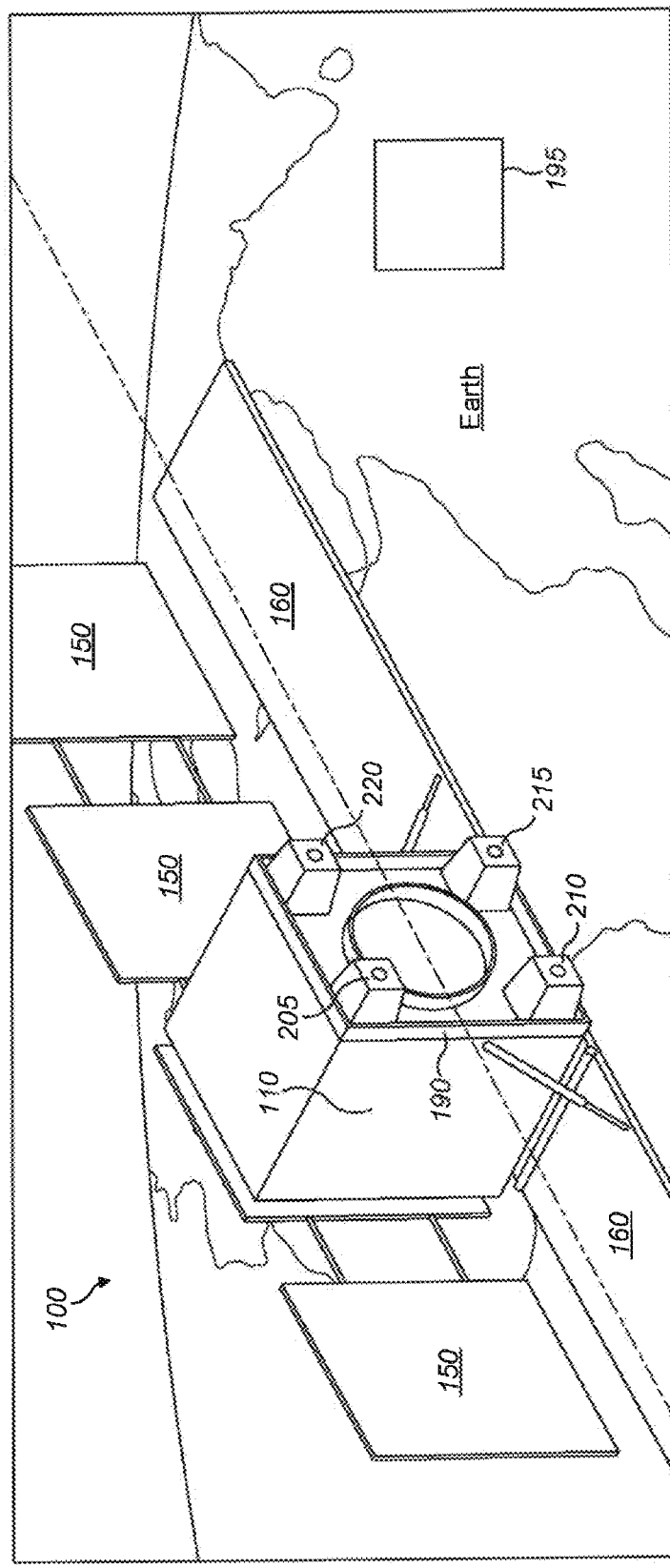
FIG. 1 is a schematic perspective view of a satellite in orbit above Earth.

Common reference numerals are used throughout the figures to indicate similar features.

DETAILED DESCRIPTION

Embodiments of the present invention are described below by way of example only. These examples represent the best ways of putting the invention into practice that are currently known to the applicant although they are not the only ways in which this could be achieved.

Some embodiments of the invention provide systems and methods for processing SAR image data to detect and/or suppress ambiguities. For this purpose, a SAR may be carried on a platform travelling with respect to the surface of Earth. For example, a SAR is commonly used onboard satellites. However, the methods and systems described here are not limited to data obtained from space and may be performed on data obtained using aircraft or any other suitable platform.

FIG. 1 is a perspective view of a satellite 100 in orbit over Earth as an example of a platform which may be used in the methods and systems described here. The satellite comprises a body 110 and "wings" 160. One or more SAR antennas may be mounted on the satellite wings. The satellite 100 additionally comprises a propulsion system 190 shown to be mounted on the body 110 on the surface opposite the solar panels 150. The propulsion system can comprise thrusters 205, 210, 215, 220, which are part of the system for operating and maneuvering the satellite 100 to position it appropriately for capturing SAR imagery of the Earth. A computing system may be housed in the satellite body 110 which may be configured to implement some of the operations described here. In some embodiments of the invention, there is also provided a ground station and/or computing systems 195 configured to post-process the SAR data received from the satellite 110 and/or to implement some of the operations described here.

As is known in the art, a SAR is operated to alternate periodically between transmission mode in which a pulse of radiation is directed towards the surface of Earth and reception mode in which radiation reflected from the surface is received.

As is also known in the art, to create a SAR image, successive pulses of radio waves are transmitted to "illuminate" a target and the echo of each pulse is received and recorded. The pulses can be transmitted and the echoes can be received using a single beam-forming antenna. As the SAR is carried on board a moving platform, such as a satellite, and therefore moves with respect to the target, the antenna location relative to the target changes with time and the frequency of received signals changes due to the Doppler effect. Signal processing of the successive recorded radar echoes allows the combination of recordings from multiple antenna positions thereby forming the synthetic antenna aperture to allow creation of high resolution images.

An area currently captured by the SAR is known as a footprint. A direction along the flight direction of the SAR is usually referred to as azimuth or along track. A direction transverse to the flight direction is usually referred to as range, elevation or cross-track. A direction opposite to the flight direction corresponds to the backward azimuth direction.

Ambiguities in SAR images are an aliasing effect due to the pulsed operation of the radar system. The effect of ambiguities is to create artifacts in images that do not accurately represent the ground being imaged. For example, an image may contain a feature that appears more than once.

In one example of an ambiguity that can arise, a dense urban area can appear in its correct location, and then an artifact of that part of the image can also appear elsewhere in the image, for example over a smooth body of water, which is clearly incorrect. This "ambiguity" degrades the quality of the SAR image.

Spaceborne systems can produce two types of ambiguities: azimuth ambiguities or Doppler ambiguities that are related to the motion of the satellite in the azimuth direction, and range ambiguities that are related to the time delay of echoes from different distances in the range or cross-track direction of a side-looking SAR satellite. Ambiguities can be reduced through careful antenna design, for example by selecting the antenna size and pulse repetition frequency (PRF) carefully. For example, increasing the PRF will tend to reduce the occurrence of azimuth ambiguities. However, increasing the PRF also has the adverse effect of increasing the occurrence of range ambiguities. Therefore, a balance needs to be struck between designing the system to reduce azimuth ambiguities while not causing too many range ambiguities, and it is impossible to fully compensate for both types of ambiguities through the design of the SAR system alone. This is particularly true in light of modern satellites that have requirements for smaller antennas. In fact, the design constraints of smaller lighter satellites have for example tended to increase the occurrence of azimuth ambiguities. Being able to detect ambiguities is important for accessing the quality of SAR image. Also, being able to detect and then suppress ambiguities is desirable for removing the ambiguities from the image.

Embodiments according to the current disclosure teach computer-implemented methods for detecting one or both of azimuth and range ambiguities using a novel approach based on a Phase Derivative Value (PDV). In an example, a Phase Variant Analysis is used to detect ambiguities by using dedicated filtering and derivative phase information.

Embodiments according to the current disclosure also teach novel computer-implemented methods for suppressing azimuth ambiguities. In an example, azimuth ambiguities are detected and suppressed using Selective Doppler Frequency Suppression (SDFS) to filter selectively the ambiguity frequencies in the Doppler spectrum, detecting the ambiguous spectral signals that have a coupled dependence in azimuth and range.

Figure 2:
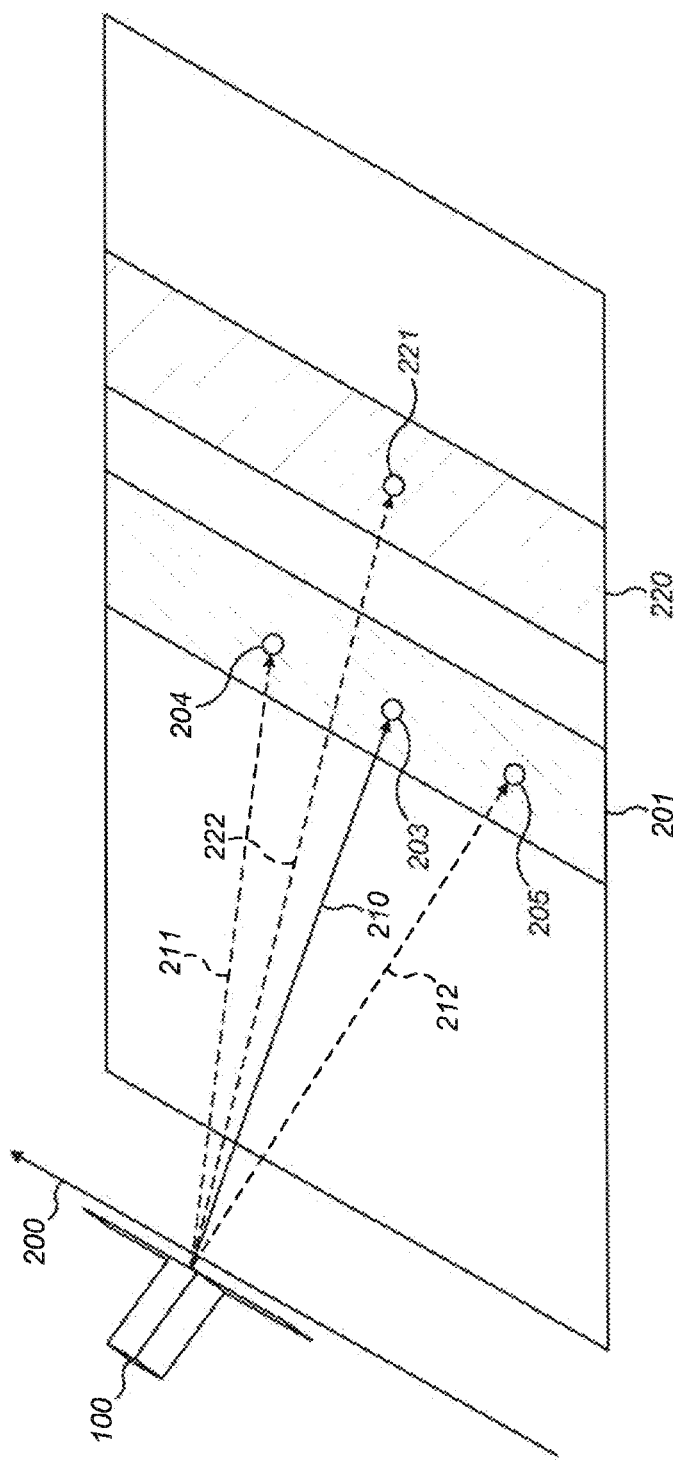
FIG. 2 is a schematic view of a satellite imaging an area on the Earth.

One contributing source of ambiguities in SAR images relates to the pattern of the SAR antenna beam. FIG. 2 shows an example of how these ambiguities can arise. A satellite 100 is shown travelling along a flight track 200 which defines the azimuth direction. The direction orthogonal to the flight track 200 towards the area to be imaged is the range or cross-track direction. The satellite is operating in a "side-scan" mode where the area to be imaged is off to the side of the flight path of the satellite rather than directly underneath it. This is typical for SAR satellites since the bright return due to specular reflections from objects directly underneath the satellite, i.e. the nadir region, make it difficult to form an image of that region. The shaded region 201 represents an area, or strip, to be imaged.

FIG. 2 shows an example of satellite 100 operating in a classic strip map mode, where the SAR beam is swept along one swath along the ground (represented by shaded area 201) as the satellite travels in its orbital path. In this mode, the SAR beam will typically travel in the azimuth direction at the same speed as the SAR platform. The time during which a radar beam collects data during a forward sweep is called the integration time. Many pulses may be recorded during the integration time. Examples according to the current disclosure can be equally applied to any SAR mode, including for example spotlight mode, ScanSAR (Scanning Synthetic Aperture Radar) mode, and TOPSAR (Terrain Observation with Progressive Scans SAR) mode. In an example, the satellite 100 is directing a radar beam 210 orthogonally to the satellite's direction of motion 200 and records the radar echoes from point 203 to determine information about the Earth's surface at that location. This information is then formed into an image of the Earth's surface. However, due to the difficulties of forming a perfectly directed radar beam, there are typically sidelobes to the main beam, represented in the azimuth direction by lines 211 and 212, that can cause echoes from points 204 and 205 to be mixed in with the echoes from point 203. This creates azimuth ambiguities in the signal because features (e.g., a building) located at point 204 can show up in the SAR image at both point 203 and 204.

Similarly, range ambiguities can be caused by echoes returning from sidelobes in the range direction, an example of which is represented by line 222, mixing in with returns from the (non-ambiguous) area to be imaged 201 due to differences in the slant range distance. The shaded area 220 represents an area that is outside of the area to be imaged 201, sometimes known as a range ambiguous area. The slant range distance to the point being imaged is represented by line 210. The slant range distance to point 221 in the ambiguous region is represented by line 222. The slant range distance of the two points is different, and the difference in time it takes for the radar signal to travel to the two points causes a time delay. The time delay leads to echo returns from the side lobe mixing in with the echo returns of a later pulse from the main lobe and causing range ambiguities. Only one range ambiguous region 220 is shown as an example, but in practice there are additional regions (for example closer to the satellite) corresponding to the various sidelobes of the antenna beam in the range direction that all contribute to generating range ambiguities.

FIG. 2 illustrates how ambiguities can be formed as a result of the antenna beam pattern, but other ambiguities are also possible as described below. The result of ambiguities is that an image may contain ambiguous and unambiguous pixels due to a feature "appearing" in more than one location. In the following, the term "ambiguous pixel" refers to a pixel that contains signal data that may be from more than one location.

Embodiments described in this disclosure provide improved methods for detecting ambiguities in SAR data and may include identifying areas in a SAR image that have ambiguities in them. Other embodiments describe improved methods for detecting and suppressing the ambiguities in SAR data to allow the production of high-quality SAR images that have fewer ambiguities or reduced ambiguities. Referring again to FIG. 1, this data processing related to these embodiments may take place at the ground station 195, or another location on Earth, for example in communication with the ground station 195. Alternatively, some or all of the operations described here may be performed at an onboard computing system, if sufficient processing power is available. The data processing may use all the pulses transmitted during the integration time to focus the data in the azimuth direction.

As noted elsewhere, the methods described here are particularly but not exclusively suited to implementation in connection with a SAR carried on a satellite.

In addition to ambiguities arising from the SAR antenna beam pattern, other contributors to the occurrence of ambiguities in SAR images relate to the processing of the SAR data. For example, ambiguities can arise as a result of Range Migration Compensation (RMC) algorithms and errors in Doppler centroid estimation. Unlike the first source of ambiguities that arise due to a physical property of the antenna beam, these ambiguities arise due to processes required to turn the raw SAR data into an image.

Figure 3:
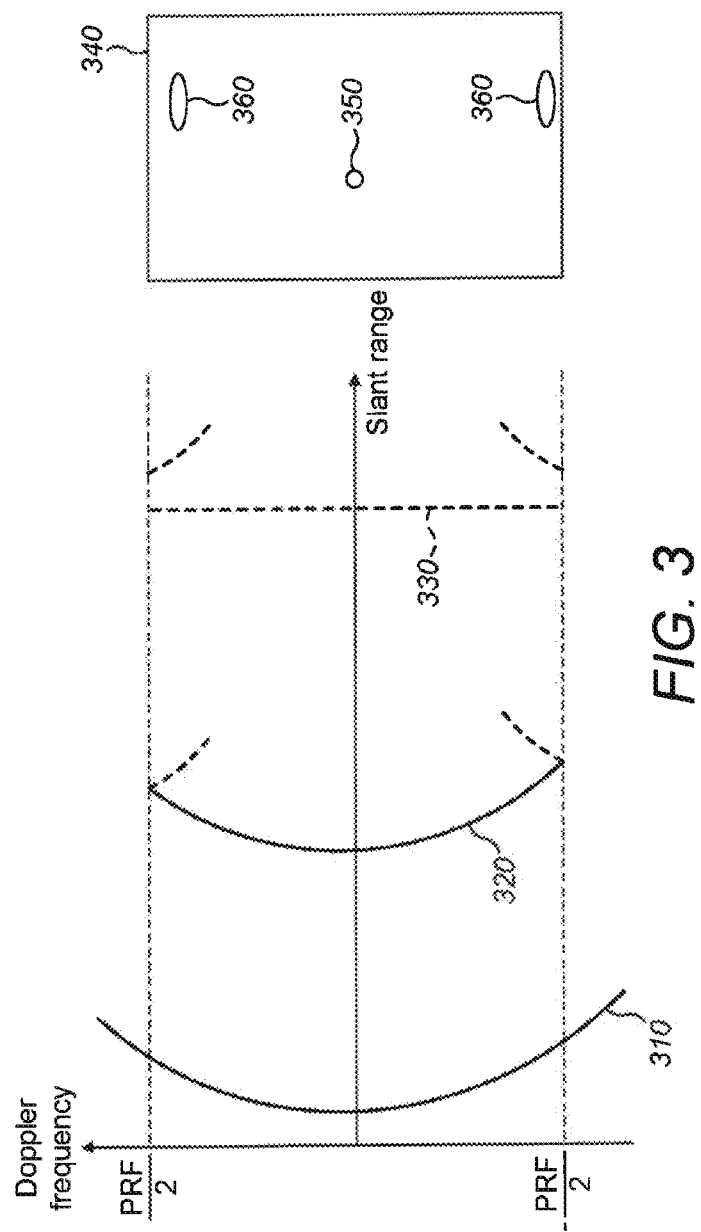
FIG. 3 is a schematic illustration of ambiguity generation due to range migration compensation.

FIG. 3 shows how azimuth ambiguities can arise as a result of the Range Migration Compensation algorithms that may be performed on SAR data to account for differences in range to the target due to the movement of the SAR platform. It should be noted that azimuth signals correspond to signals at different points along the direction in which the satellite is travelling (azimuth direction), and these signals are time tagged during acquisition which creates "azimuth time". Range signals corresponds to signals at different points substantially perpendicular to direction of travel (range direction), and these signals are time tagged during acquisition which creates "range time".

The y-axis shows the Doppler frequency shift of the SAR data, and the x-axis shows the slant range, as well as the different operations of the RMC algorithm. If the spectral signature of a target exceeds the azimuth bandwidth defined by the Pulse Repetition Frequency (PRF) (in FIG. 3, this is illustrated by the curved line 310 representing the slant range crossing the bandwidth defined by the dotted lines), then aliasing wraps the portions of spectrum outside the PRF into the useful bandwidth (line 320, dotted line). The curvature in line 310 and the solid part of line 320 represents a constant distance to the target, whereas in fact the slant range can change during the integration time due to motion of the SAR platform travelling in the azimuth direction during the integration time. Slant range is the distance between the satellite and a point on the ground (e.g., point 350) along a straight line directly between the satellite and the point.

The resulting range migration is given by:

$$R(f_D) = R_0 / D(f_D, V_r) \quad (1)$$

with D migration factor:

$$D(f_D, V_r) = \sqrt{(1 - (\lambda^2 f_D^2)/(4V_r^2))} \quad (2)$$

In equations 1 and 2, $f_D$ is the Doppler frequency, $R_0$ is the slant range at the zero Doppler. $R_0$ represents the shortest direct distance between the satellite and target point 350. $V_r$ is the relative velocity between the antenna and the target, and $\lambda$ is the wavelength.

Range Migration Compensation techniques known in the art can be applied to compensate for this change in slant range distance as the satellite moves. For example, the dotted line 330 is produced after applying a range migration compensation algorithm. The main portion of line 330 is now straight instead of curved, indicating that the change in slant range distance has been compensated for. However, it can be seen to still contain the portions of spectrum outside the PRF. The result is that (after RMC) the image 340 comprises the target signal 350, as well as the two ambiguities 360 formed by the portions of spectrum outside the bandwidth.

Other sources of ambiguities in SAR images are known in the art. In an example according to the current disclosure, ambiguities in SAR images can be detected and pixels in the image that affected by these ambiguities can be identified using a novel approach based on Phase Derivative Values, as described below.

SAR data is the sum of a main signal from the area being imaged and the signal generated by the ambiguities:

$$\zeta(s, t) = M(s, t) + A(s, t) \quad (3)$$

where M is the ambiguity-free signal, A is the ambiguity signal and s and t are, respectively, the azimuth and the range time. The main signal after azimuth compression is:

$$M(s, t) = p_{rg}(t) p_{az}(s) e^{-j\frac{4\pi}{\lambda}R_0} e^{j2\pi f_{dc}s} \quad (4)$$

where $p_{rg}$ and $p_{az}$ are the sinc-like amplitudes of the impulse response function in range and azimuth, and $f_{dc}$ is the Doppler centroid.

The phase of M is composed by a linear term, that represents the residual phase due to the non-zero Doppler centroid, and by a constant phase due to the target position:

$$\angle M(s, t) = 2\pi f_{dc} s - \frac{4\pi}{\lambda} R_0 \quad (5)$$

In the ambiguity signal shown below an additional phase term $\Phi$ appears. In the case of range ambiguity $\Phi$ depends only on the azimuth time, while in case of azimuth ambiguity it depends on both range time and azimuth time:

$$\angle A(s, t) = 2\pi f_{dc} s - \frac{4\pi}{\lambda} R_0 + \Phi(s, t) \quad (6)$$

The derivative of the phase, referred to here as the Phase Derivative Value (PDV), for the main signal and the ambiguity signal with respect to range and azimuth are:

$$\angle M(s, t): \begin{cases} \frac{\partial \angle M(s, t)}{\partial s} = 2\pi f_{dc} \\ \frac{\partial \angle M(s, t)}{\partial t} = 0 \end{cases} \quad (7)$$

$$\angle A(s, t): \begin{cases} \frac{\partial \angle A(s, t)}{\partial s} = 2\pi f_{dc} + \frac{\partial \Phi(s, t)}{\partial s} \\ \frac{\partial \angle A(s, t)}{\partial t} = \frac{\partial \Phi(s, t)}{\partial t} \end{cases} \quad (8)$$

It turns out that that the derivative of the phase of the main signal in azimuth and range is, respectively, a constant and zero, while the derivative of the phase of the ambiguity signal is azimuth and range variant.

In the example ambiguity detection method described in the following, the phase is analyzed to detect of all the ambiguities and to discriminate the azimuth ambiguity signal from the main signal. The presence of any pixels in an image that have a phase derivative different from zero suggests that ambiguities are present, while pixels with phase derivatives close to zero can be assumed to contain only the main signal. A threshold operation on the phase derivative may be used to differentiate ambiguous pixels from unambiguous pixels.

Thus, a method according to an embodiment of the invention comprises calculating at least one phase derivative value for respective pixels represented by the SAR data, determining a threshold for the phase derivative value, and determining pixels with phase derivative values above the threshold to be ambiguous. The phase derivative value represents the rate of change of phase from one pixel to another and may be calculated based on a subset of the data. For example in the method described in the following the image data is divided into tiles and the phase derivative values are performed on a per-tile basis. In principle, the phase derivative value may be calculated with respect to any spatial direction. In the following only range and azimuth are considered.

Equations 7 and 8 are calculated on the data using the PDV, that allows the main signal to be decoupled from the ambiguous signal for every pixel. The PDV alone can be used to detect ambiguities and, for example, test the effectiveness of ambiguity suppression techniques, some of which are described below. In the following a method is disclosed in which the PDV with respect to both range and azimuth are determined in order to distinguish ambiguous pixels from unambiguous pixels. However, the PDV with respect to any variable is useful in determining which pixels are ambiguous. Thus for example pixels may be discriminated using a PDV with respect to range only or azimuth only.

The PDV can be used to detect ambiguities in SAR images. However, other contributions may interfere with the signal phase, and false alarms can be raised resulting in improper detections of ambiguities. For example, motion of the target being imaged contributes to the phase term, and this can result in the false detection as ambiguities of moving targets, such as ships, and of moving surfaces, such as the sea surface in presence of wind and waves. Also an offset in the phase can be introduced if the target is not focussed properly during the processing of the raw SAR data. The PDV results can also be sensitive to the IRF sidelobes of strong targets.

In the following, an algorithm to detect ambiguities is presented which uses phase derivative values while reducing some of the limitations described above. This algorithm is named Phase Variant Analysis (PVA). The PVA algorithm uses PDV along with a combination of dedicated filtering to reducing the aforementioned limitations. For example, decreasing of the IRF sidelobes can be performed with the addition of filtering the image data prior to calculating a phase derivative value. In particular this may be achieved with the use of smoothing windows (e.g., band pass filtering) of the Doppler signal spectrum. The use of the smoothing windows or filters is able to reduce the sidelobes, but at the same time also reduces the sensitivity to detect the ambiguous signals localized in the spectrum borders. In some examples of the present invention, a dedicated adaptive filtering is subsequently used to reduce the sidelobes, while preserving the spectrum frequencies in which the ambiguities are located (e.g., an adaptive weighting to preserve the portion of the spectrum that contains the ambiguity).

The algorithm described below is performed on single look data, and includes optional weighting of PDV by a factor depending on the difference between range looks. The thresholding may then be performed on the weighted phase derivative values (see equation 27 below).

Figure 4:
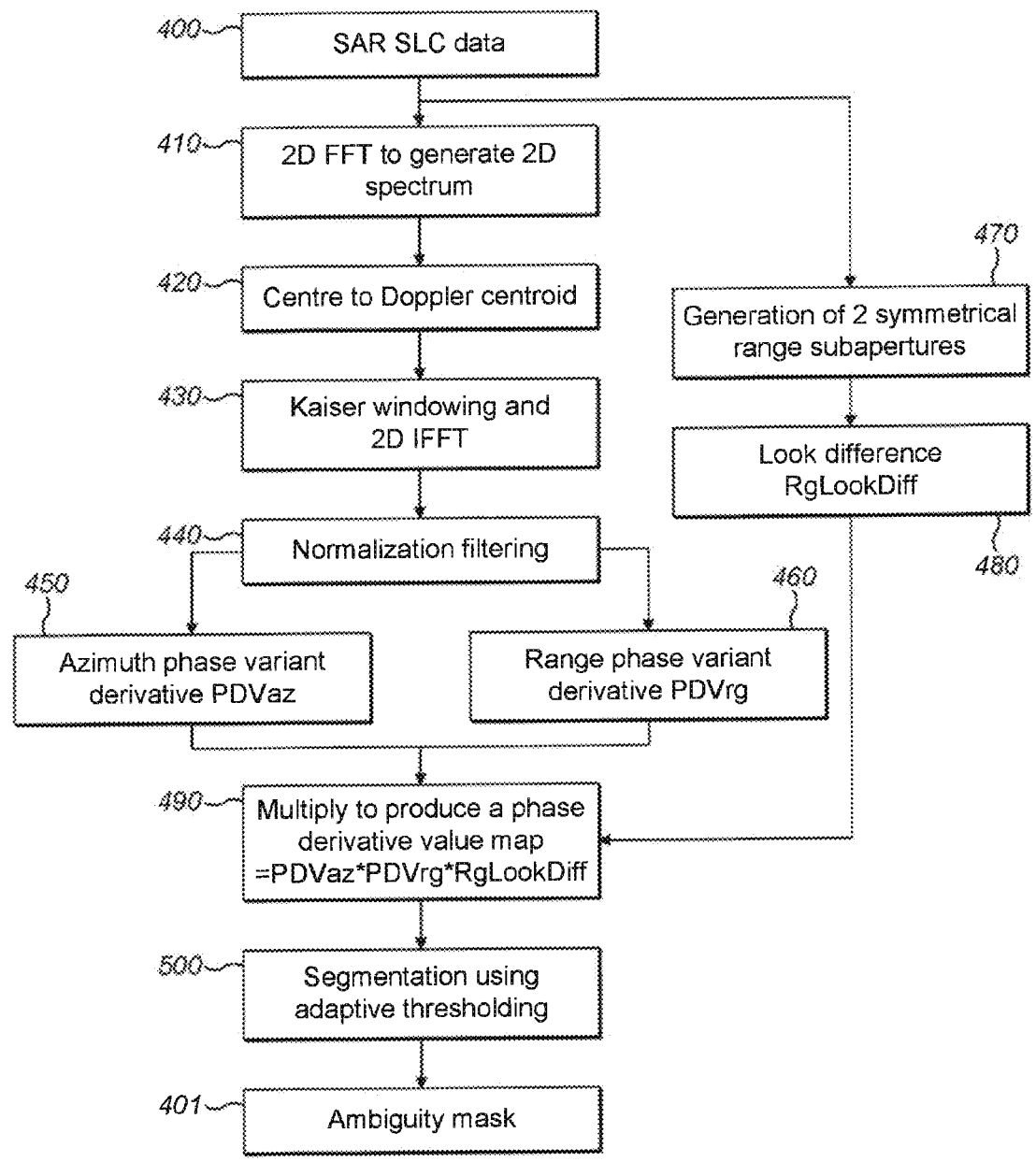
FIG. 4 is a flowchart illustrating a Phase Variant Analysis (PVA) algorithm according to some embodiments of the invention.

Operations comprising an example of a PVA algorithm are shown in FIG. 4. Note that in this example the algorithm is applied to portions of data. The full image data is divided into tiles, and the algorithm is performed independently for each tile. In this example it is assumed that the starting data 400 is SAR single look complex "SLC" data. SAR data is complex by nature, including both am amplitude and phase. Note however that the use of phase derivative values to detect ambiguities is not necessarily limited to single look data.

The PVA algorithm is based on the following steps. First, the complex data that includes the main signal and the ambiguous is given by:

$$\zeta(s, t) = p_{rg}(t)p_{az}(s)\exp\left(-j\frac{4\pi}{\lambda}R_0\right)\exp(j2\pi f_{dc}s + \Phi(s, t)) \quad (9)$$

where $P_{rg}$ and $P_{az}$ are the sinc-like amplitudes of the impulse response function (IRF) in range and azimuth, $R_0$ is the minimum range to the target, and $f_{dc}$ is the Doppler centroid, and $\phi(s, t)$ is an additional phase term dependant on range time and azimuth time.

In step 410, a two-dimensional Fast Fourier Transform (FFT) with respect to azimuth time and range time is performed to generate a two-dimensional Doppler spectrum of the SAR SLC data in frequency space. Each pixel of the SAR SLC data contains the magnitude and phase of both main and the ambiguous signals.

Next, at operation 420 the SAR data spectrum is shifted to the Doppler centroid. This has the effect of providing a symmetrical Doppler spectrum that has in its centre the Doppler centroid:

$$\zeta(s, t) = \zeta(s, t) \cdot \exp(-j2\pi f_{dc}s) \quad (10)$$

The phase of the data is:

$$\angle\zeta(s, t) = 2\pi f_{dc}s - 2\pi f_{dc}s - \frac{4\pi}{\lambda}R_0 + \Phi(s, t) = -\frac{4\pi}{\lambda}R_0 + \Phi(s, t) \quad (11)$$

At operation 430, the shifted SAR SLC data is windowed or (filtered) to remove sidelobes as described above. The Doppler spectrum may be windowed using a classical smoothing windowing function, such as Hamming, Hanning, Kaiser or other suitable function, to produce a windowed Doppler spectrum. Subsequently, an Inverse Fast Fourier Transform (IFFT) is applied to the windowed Doppler spectrum with respect to range and azimuth (IFFT2) to obtain a windowed Doppler spectrum in time space. For example, the Doppler spectrum may be windowed using a Kaiser window to produce a windowed Doppler spectrum as follows:

$$\zeta'(s, t) = IFFT2(FFT2(\zeta(s, t)) \cdot K(f_{dc}, f_r)) \quad (12)$$

where $K(f_{dc}, f_r)$ defines the Kaiser window in the 2D frequency domain, and $f_{dc}$ and $f_r$ are the Doppler frequency and the range frequency, respectively. The windowing allows the reduction of the sidelobes of the compressed IRF, decreasing the interference between targets whilst preserving Doppler frequencies with higher energy corresponding to the ambiguous signals to maintain high sensitivity to other ambiguities. This filtering is done because strongly reflective targets can produce false positive ambiguity detection.

At operation 440, a normalization filtering operation is applied on the data. This filtering normalises the Doppler energy of the azimuth dependent spectral signatures, increasing the power of the ambiguous signals relative to the main signal. The normalisation has the effect of decreasing the power of the properly focussed main signal of targets with high backscattering, while the improperly focussed ambiguous signal is not reduced. Hence the power of the ambiguous signal is effectively increased and becomes easier to detect and filter out. The operation is represented by:

$$\zeta_N(s, t) = \frac{\zeta'(s, t)}{|\zeta'(s, t)|^\alpha} \quad (13)$$

At operation 450, the Phase Derivative Value is applied in azimuth with the following operations:

$$\zeta_{az1}(s, t) = IFFT2(FFT2(\zeta_N(s, t)) * \exp(j\pi\Delta_{azimuth}s)) \quad (14)$$

$$\zeta_{az2}(s, t) = IFFT2(FFT2(\zeta_N(s, t)) * \exp(-j\pi\Delta_{azimuth}s)) \quad (15)$$

The resulting Phase Derivative Values are given by:

$$PDV_{az}(s, t) = \angle(\zeta_{az1}(s, t) \cdot \zeta_{az2}^*) = \frac{\partial \angle \zeta_N(s, t)}{\partial s} = \frac{\partial \Phi(s, t)}{\partial s} \quad (16)$$

The phase derivative may then be averaged by using mean convolutional filters in an additional operation, not shown. The phase derivative in azimuth is zero for the main signal and is different from zero for the ambiguities. This term is sensitive to many azimuth dependent signals, such as azimuth ambiguities, multiple-bound reflections (especially in urban environment), range ambiguities, very fast moving targets that move in range or azimuth, IRF sidelobes of strong targets, surfaces with complex geometry that changes in time (as the sea surface in presence of waves), and targets constituted by different scatterers in complex geometry, such as a slope. In this case, the slant range at zero Doppler $R_0$ can change in the pixel area during the synthetic aperture generating an additional contribution to the phase:

$$\zeta(s, t) = \quad (17)$$

$$p_{rg}(t)p_{az}(s) \exp\left(-j\frac{4\pi}{\lambda}R_0\right) \exp\left(-j\frac{4\pi}{\lambda}\Delta R_0(s)\right) \exp(j2\pi f_{dc}s)$$

In this case the Phase Derivative Values in azimuth are:

$$PDV_{az}(s, t) = \frac{\partial \angle \zeta_N(s, t)}{\partial s} = \frac{\partial \Phi(s, t)}{\partial s} - \frac{4\pi}{\lambda}\frac{\partial \Delta_0(s)}{\partial s} \quad (18)$$

At operation 460, the Phase Derivative Value with respect to range is calculated for the normalised SAR SLC data as follows:

$$\zeta_{rg1}(s, t) = IFFT2(FFT2(\zeta_N(s, t)) \cdot \exp(j\pi\Delta_{range}t)) \quad (19, 20)$$

$$\zeta_{rg2}(s, t) = IFFT2(FFT2(\zeta_N(s, t)) \cdot \exp(-j\pi\Delta_{range}t))$$

The Phase Derivative Values in Range are:

$$PDV_{rg}(s, t) = \angle(\zeta_{rg1}(s, t) \cdot \zeta_{rg2}^*)\frac{\partial \angle \zeta_N(s, t)}{\partial t} = \frac{\partial \Phi(s, t)}{\partial t} \quad (21)$$

As in the previous case with azimuth, the Phase Derivative Values in range may then be averaged by using mean convolutional filters, and the Phase Derivative Values in range are zero for the main signal and different from zero for the ambiguous signal. This term is sensitive to the range dependent signals, such as azimuth ambiguities and fast moving targets moving in range. However, the phase derivative in range is less accurate that the phase derivative in azimuth due to the fact that the range dependency of azimuth ambiguities is less important than the azimuth dependency. Note that ordering of operations 450 and 460 is not important, and they can also be performed in parallel.

Having calculated two phase derivative values, in this case with respect to azimuth and range respectively, optionally after one or more of the shifting, filtering and normalising as described above, the threshold which is used for determining whether or not a pixel is ambiguous may be determined from a combination of the phase derivative values, for example the product of the phase derivative values.

In parallel with the above sequence of operations, two symmetrical sub-apertures in range are generated with the following operations in step 470:

$$\zeta_{rg1}(s, t) = IFFT_{rg}(FFT_{rg}(\zeta_N(s, t)) \cdot F_{subaperture1}(s, f_r)) \quad (22, 23)$$

$$\zeta_{rg2}(s, t) = IFFT_{rg}(FFT_{rg}(\zeta_N(s, t)) \cdot F_{subaperture2}(s, f_r))$$

Where $F_{subaperture1}$ and $F_{subaperture2}$ are respectively filters that select the first 50% of spectrum and the last 50% of spectrum. This allows generation of two non-overlapped sub-apertures. The filters for the sub-aperture generation are implemented in the time domain, and correspond to finite impulse response "FIR" filters that allow filtering of a desired band:

$$h_D(n) = \frac{B_{look}}{B} \cdot \text{sinc}\left(\frac{\pi n \cdot B_{look}}{B}\right) \cdot w(n) \exp\left[j2\pi f_{ci}\left(\frac{n}{B}\right)\right] \quad (24)$$

Here, B is the signal band, $B_{look}$ is the desired band, w is the weight window to apply (with the aim to reduce the Gibbs phenomenon) and $f_{ci}$ is the central frequency of the look. The filters are then calculated in the frequency domain by applying the FFT. In this case the filtering of the subaperture is realised by multiplying the data spectrum with the filters in the frequency domain.

The azimuth ambiguities are not co-located in different range looks, due to their wavelength dependence, and the azimuth separation between two half band range looks corresponds to half of the indicated spread.

At operation 480, a normalised difference of range looks is generated by taking the difference between the two symmetrical range sub-apertures (equations) as follows:

$$L_{diff} = |\zeta_{LookRg1}(s't) - \zeta_{LookRg2}(s't)| \qquad (25)$$

Subsequently, the look difference is normalised to produce a normalised look difference as shown below:

$$L_{diff} = \frac{L_{diff}}{\max(L_{diff})} \qquad (26)$$

The difference between range looks is moderately sensitive to azimuth ambiguities. The major advantage is the low sensitivity to strong targets in urban environments: the use of the normalised range look difference has the main purpose of reducing the false detections of strong targets that have a phase gradient, for example those in urban areas.

The normalised difference of range looks is then used to weight the Phase Derivative Values $PDV_{az}$ and $PDV_{rg}$ by multiplying them together in operation 490 to generate a final PDV map or a map of Azimuth Ambiguity to Signal Ratio (AASR) for each pixel with the following operation:

$$AASR(s, t) = PDV_{az}(s, t) \cdot PDV_{rg}(s, t) \cdot L_{diff} \qquad (27)$$

In step 500, an Azimuth Ambiguity Mask 401 is generated from the ambiguity map by a segmentation or binarisation process, for example using a suitable threshold. Thus either or both of a map and a mask may be generated corresponding to all or part of the original image data. For the mask, the threshold may be chosen depending on the manner or imaging mode in which the image data was obtained. The mask can be used to overlay the original image to highlight the pixels that have ambiguities in them. The ambiguity mask also allows the calculation of the percentage of the image that is affected by the ambiguous energy.

Note in this example that the algorithm is applied in portions of data. The full image is divided in tiles, and the algorithm is performed independently for each tile. The ambiguity map generation can be used to generate automatically quality metrics in terms of ambiguity occurrence. Moreover, the algorithm could be used to identify areas of the image in which the ambiguity suppression is needed.

In this example where the data comprises single look data, each phase derivative value may be weighted by a by a factor depending on the difference between range looks, with the threshold being applied to the weighted phase derivative values.

In this particular example, the map will have values in radians. The stronger the ambiguity, the higher is the absolute value in radians. It should be noted that the value in radians depends on the ambiguous energy amount, but it is not an exact measure of the signal to ambiguity ratio. In general, any of the methods described here, in which a phase derivative value is calculated, may be used to generate a map of values that enables the identification of pixels affected by ambiguities.

The particular PVA algorithm as described above may be used to identify areas in images formed from SAR SLC data that comprise ambiguities. In addition, the algorithm may be used to decide if further processing of the SAR SLC data is required to suppress the ambiguities. Additionally, the PVA map generation algorithm may be used to automatically generate quality metrics in terms of ambiguity occurrence. For example, an ambiguity map generated with a suitable threshold may be used to determine the percentage of an image that is affected by ambiguous energy and may be used to evaluate the effectiveness of image suppression techniques, some examples of which are described further below.

The example PVA algorithm has been tested and validated by using simulated and real data. The following will show the performance metrics calculated on simulations and the results obtained on real data. A dedicated SAR SLC data simulator was used with the purpose of generating simulated ambiguities for validating the algorithm. The SAR SLC data simulator generates the raw data of targets using the full antenna pattern radiation, that includes the sidelobes that generate undesired received energy. The simulated data of the sidelobes are inserted in real scenarios following the processing operations:

The SLC data are defocused in range and azimuth to generate the raw data.

The simulated raw data of the ambiguities are summed to the real raw data according to the overlapping and sum principle.

The data are focused in range and azimuth obtaining the simulated ambiguities in real data.

The position and Signal to Clutter Ratio are defined randomly by using an uniform distribution. The SAR data simulator is a useful tool for recreation of on-demand realistic scenarios for generation of specific targets, needed for algorithm testing and validation. Fifty simulated ambiguities of first order and fifty of second order have been used to calculate the performance metrics. Only strip map acquisition mode was used for the calculation of the metrics in this example.

The PVA algorithm allows the detection of ambiguities and the generation of ambiguity maps. Its performance has been measured using simulated data. The ambiguity is considered successfully identified when a minimum cluster of n ambiguous pixels are detected as ambiguities, presenting a derivative phase higher than the threshold T used to quantify AASR in operation 500. In the present simulation, n=15 pixels and T=0.6 radians.

Figure 5:
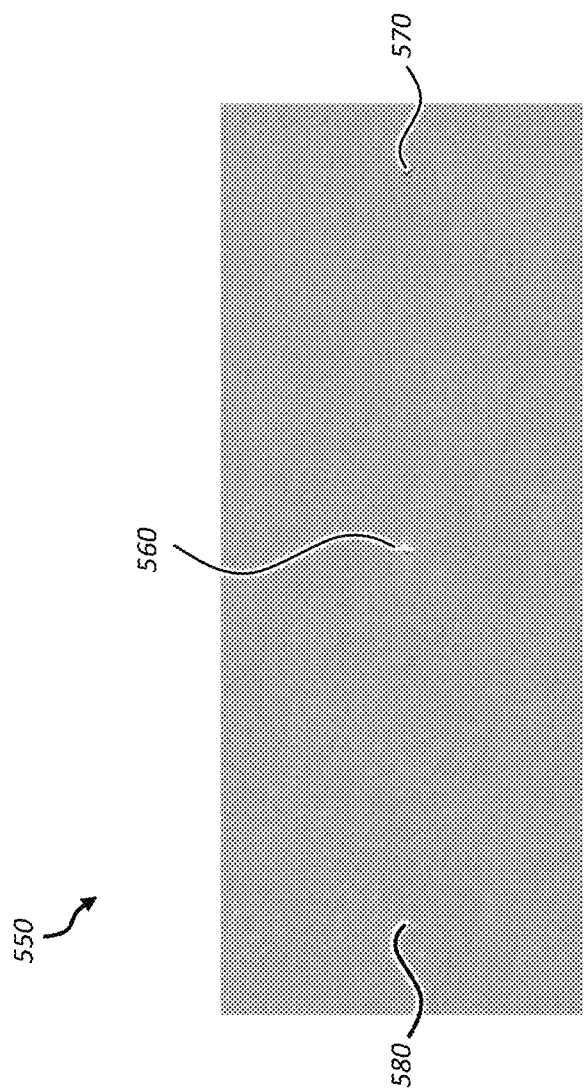
FIG. 5 is an image showing a feature and an two ambiguous images of the same feature.

FIG. 5 shows an example of an image 550 generated from the SAR SLC data using the SAR simulator described above. Embedded in the data is a simulated ship 560 along with two realistic ambiguities associated with the ship. The SAR SLC data was processed using the Phase Variant Analysis according to the example described earlier and was successfully able to detect both the right ambiguity 570 and the left ambiguity 580, as indicated by the dark and light spots. A ship is quite a small target when imaging from space so this was a good test of the capabilities of the PVA method for detecting ambiguities using the PDV approach.

Table 1 shows ambiguity detection performances of the PVA algorithm.

TABLE 1

| Ambiguity order | detection rate [%] |
|---|---|
| 1 | 86 |
| 2 | 91.5 |
| TOT | 88.7 |

In table 1, the detection rate (%) is shown for ambiguities of order 1 and 2. TOT is the average of the ambiguity order detection rates. The missing detection of the algorithm is related to the level of ambiguous energy that has been simulated. If the energy of the simulated target SCR (Signal to Clutter Ratio) in the real background is too low, the ambiguity will be not visible, and the algorithm could fail. FIG. 6 also represents a PDV map (generated in operation 500 in FIG. 4) of the image identifying where the PDV values are different from zero.

Figure 6B:
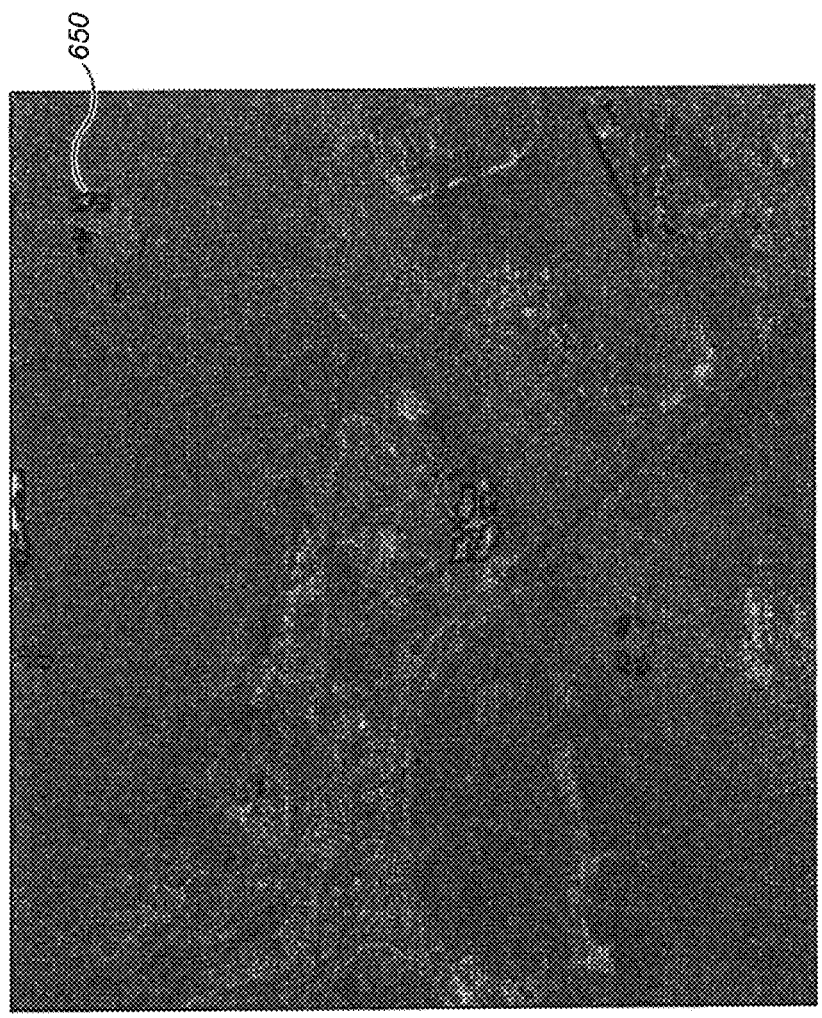
FIG. 6b is a Spotlight image showing ambiguities detected in Stripmap using the PVA method according to some embodiments of the invention.
Figure 6A:
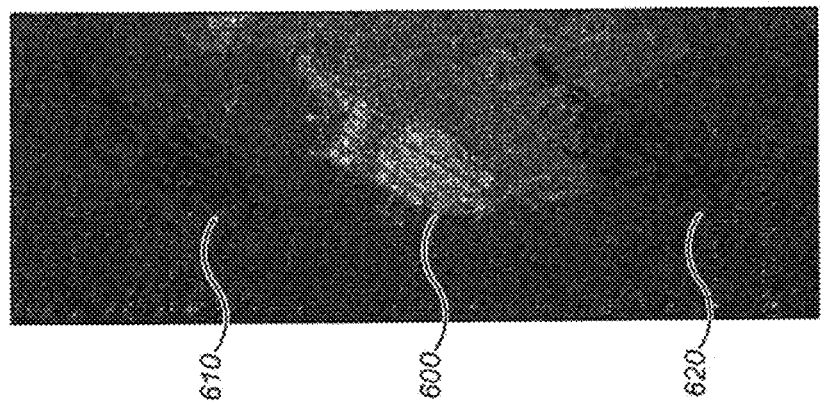
FIG. 6a is a Stripmap image showing ambiguities detected using the PVA method according to some embodiments of the invention.

The PVA algorithm has also been tested on real images. FIG. 6a and FIG. 6b, respectively, show the results of the ambiguity detection (AASR or PDV map) in Stripmap and Spotlight images where the dark areas represent ambiguity masks showing the detected ambiguities. In FIG. 6a, the lighter urban area 600 shows up three times in the image-once in its correction location at 600, and twice more at locations 610 and 620. Ambiguity 610 is over the water so is clearly not correct. Ambiguity 620 is partially over water and partially over land. The ambiguities have been detected by the PVA algorithm and a ambiguity mask has been created that highlights them by making them dark. Colours could also be used in the ambiguity mask to highlight the detected ambiguities in the SAR image.

The algorithm achieved very good results in simulated and real data. The implemented algorithm solves the problem of the ambiguity detection with light and easy techniques. The algorithm can work also when the ambiguous signature cannot be easily decoupled from the main signal. Some of the advantages of the PVA algorithm over other ambiguity detection methods are the processing speed and the independence on specific models, such as the antenna pattern. Moreover, it can be used in parallel processing, speeding the processing up even more. The dedicated spectral filtering reduces the algorithm sensitivity to urban area's multi-paths that generate many false positives and the difficulty of separating out azimuth and range ambiguities in presence of strong range ambiguities.

The examples discussed so far have involved improved methods for the detection of ambiguities in SAR images. It would also be desirable to have improved methods for the detection and suppression of ambiguities in the SAR images. As discussed in the background, existing methods for detection and suppression of ambiguities suffer from a number of limitations.

An improved method for suppressing azimuth ambiguities, which overcomes some of the problems in known methods, will now be described. This suppression method can be used by itself or in combination with the detection methods described above that use phase derivative value. For example, it can be used with the PVA detection method according to the current disclosure for determining when the azimuth ambiguity detection and suppression method is required, and also for evaluating the effectiveness of the azimuth ambiguity detection and suppression method.

The suppression method may comprise, for each SAR image, applying an amplitude threshold to the Doppler spectrum to detect ambiguous energy in the spectrum and substituting the amplitude values of detected ambiguous energy to generate a modified Doppler spectrum with the ambiguous energy suppressed. Then, azimuth ambiguity suppressed image data may be generated using the modified Doppler spectra for the affected pixels. In the following an example of this suppression method, in the form of an algorithm, will be described.

The proposed algorithm to suppress the azimuth ambiguities in SAR SLC data is named Selective Doppler Frequency Suppression (SDFS). It is based on the detection of the ambiguous azimuth and range variant energy, that can be decoupled from the main signal in the Doppler Spectrum. The algorithm can be used to perform a single pass to suppress azimuth ambiguities in the SAR data, or it can be used iteratively to detect and filter all the ambiguous signatures in the Doppler spectrum. For example, after the suppression algorithm has been applied to the SAR SLC data, the data may be used to generate image data, which is then subjected to an ambiguity detection method such as the PVA method described above. The ambiguity detection method may be used to determine the effectiveness of the suppression and, if necessary, the suppression may be repeated until an acceptable level of ambiguity suppression has been achieved, e.g. a level meeting predetermined criteria. For example, a repeat iteration of the suppression method may be performed on previously azimuth-ambiguity-suppressed image data in order to improve the suppression.

In general, the suppression method may be performed on SAR image data in the form of a received Doppler spectrum for each image, also referred to here as the "signature". The Doppler spectrum will comprise an amplitude value corresponding to each frequency in the spectrum.

A specific example of how this may be achieved will now be described. Let the Doppler spectrum for each pixel of the main signal and of the ambiguity before the RMC be:

$$\begin{cases} G_M(t, f_D) = A_0 \mathrm{sinc}\left[t - \frac{2R(f_D)}{c}\right] D_a(f_D - f_{dc}) A_1 e^{j\pi \frac{f_D^2}{f_R}} \\ G_A(t, f_D') = A_0 \mathrm{sinc}\left[t - \frac{2R(f_D')}{c}\right] D_a(f_D' - f_{dc}) A_1 e^{j\pi \frac{f_D'^2}{f_R}} \end{cases} \quad (28, 29)$$

where $$A_1 = e^{-j\frac{4\pi}{\lambda} R_0, D_a}$$

is the azimuth antenna pattern, $f_R$ the Doppler rate and where $f_D' = f_D \mp k*\mathrm{PRF}$ is the Doppler frequency corresponding to an antenna pattern sidelobe that generated the ambiguity, with $k \in \mathbb{Z}$. After the RMC and the azimuth compression, performed by multiplying the range compressed data spectrum with the azimuth reference function where $$H_{az}(f_d) = e^{-j\frac{f_D^2}{f_R}},$$

the data becomes:

$$\begin{cases} G_M(t, f_D) = A_0 \text{sinc}\left[t - \frac{2R_0}{c}\right] D_a(f_D - f_{dc})A_1 \\ G_A(t, f_D) = A_0 \text{sinc}\left[t - \frac{2R_{res}(f_D)}{c}\right] * \\ * D_a(f_D \pm k*PRF - f_{dc})A_1 e^{j\frac{\pi}{f_R}(k*PRF)^2} * \\ e^{j\frac{\pi}{f_R}2k*PRF*f_D} \end{cases} \quad (30)$$

The term $$\text{sinc}\left[t - \frac{2R_{res}(f_D)}{c}\right]$$

represents the residual amplitude signal depending on range time and azimuth frequency after the range migration compensation, that is performed to compensate the energy coming from the antenna pattern main beam, and $R_{res}$ is the residual range migration of the ambiguity. This term shows that the ambiguity spectral signature depends on range and azimuth, and after the focusing the ambiguity is spread over several range cells. The SDFS algorithm detects the energy, or amplitude, of the ambiguities by thresholding the Doppler spectrum. The threshold may be an adaptive threshold depending on statistical parameters of the Doppler spectrum; it allows to decouple the spectral signature term of the main signal azimuth dependent represented by the term $$\text{sinc}\left[t - \frac{2R_0}{c}\right]$$

and the ambiguity spectral signature range and azimuth dependent $$\text{sinc}\left[t - \frac{2R_{res}(f_D)}{c}\right]$$

that defines the energy skew in the range Doppler domain.

Figure 7:
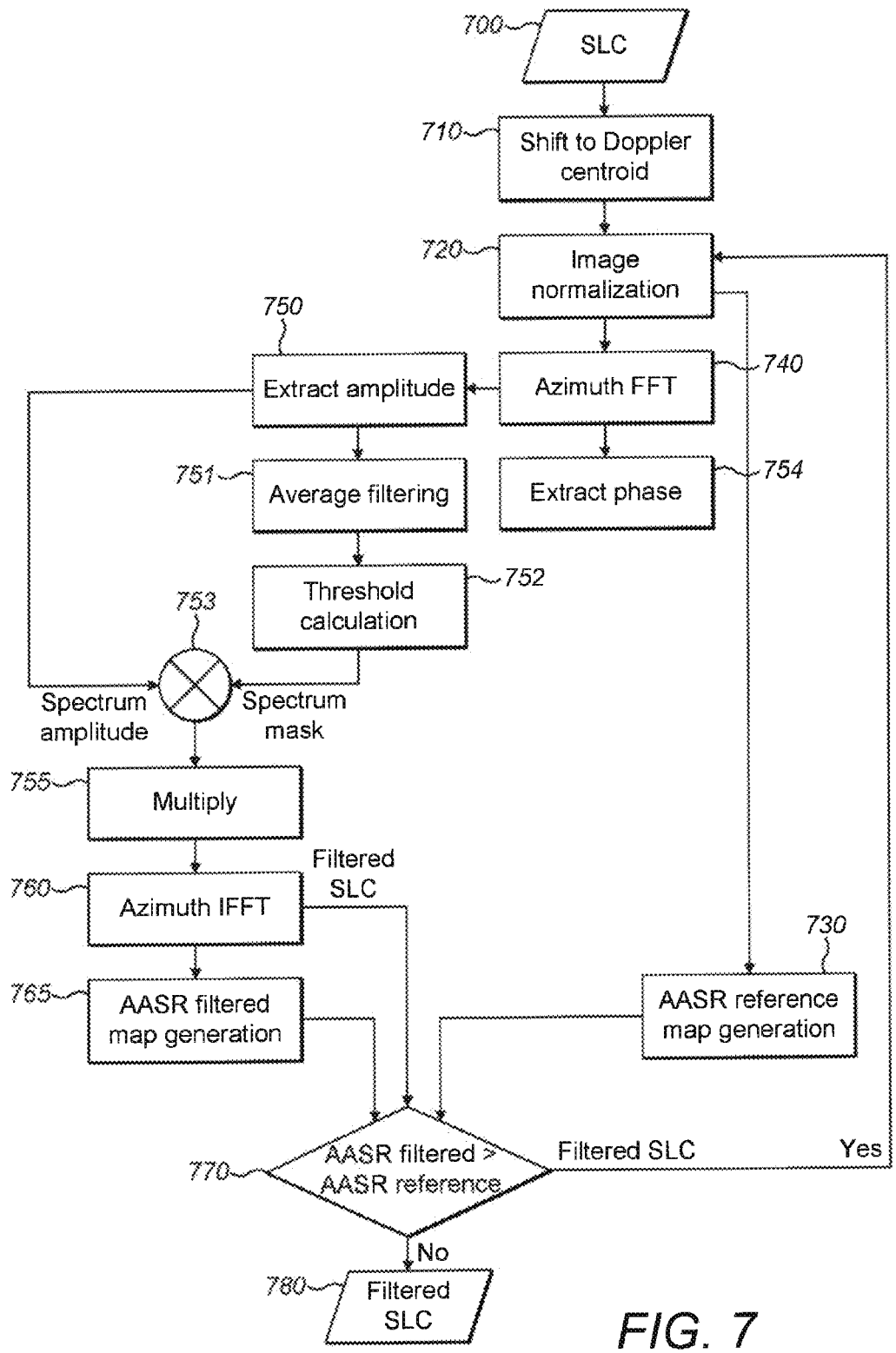
FIG. 7 is a flowchart illustrating a method of detecting and suppressing azimuth ambiguities according to some embodiments of the invention.

An example of the Selective Doppler Frequency Suppression method is depicted in FIG. 7. The process starts with the SAR SLC data at 700. In step 710, The SAR data spectrum is shifted to the Doppler centroid. It allows the data to have a symmetrical Doppler spectrum that has the Doppler centroid at its centre.

$$\zeta(s, t) = \zeta(s, t) \cdot \exp(-j2\pi f_{dc} s) \quad (31)$$

The resulting Doppler spectrum is:

$$Z(f_D, t) = FFT_{az}(\zeta(s, t)) = |Z(f_D, t)| \cdot \exp(j \angle Z(f_D, t)) \quad (32)$$

In step 720, a normalization filter is applied on the image data. This filtering allows normalization of the Doppler energy of the azimuth dependent spectral signatures, increasing the power of the ambiguous signals relative to the main signal. The normalisation has the effect of decreasing the power of the properly focussed main signal of targets with high backscattering, while the improperly focussed ambiguous signal is not reduced. Hence the power of the ambiguous signal is effectively increased and becomes easier to detect. The operation is represented by:

$$\zeta_N(s, t) = \frac{\zeta'(s, t)}{|\zeta'(s, t)|^*} \quad (33)$$

In step 730, an azimuth ambiguity map AASR (s,t) is generated. This may be generated using the PVA algorithm. Other detection algorithms could also be used in place of the PVA algorithm to generate the AASR map or other map that indicates where ambiguities are present in the image data. The amount of ambiguous energy in the image is quantified by the condition AASR (s, t)>T, where T is a threshold empirically calculated. In an example, a threshold of $T=0.62^2$ is used for Stripmap images and $T=0.7^2$ is used for spotlight images. Thus, the threshold may depend on the manner in which the image data was generated.

The generation of the ambiguity map is an optional step used in testing the effectiveness of the suppression method and does not necessarily form part of the suppression method.

In step 740, the Doppler spectrum of the normalised data is calculated using a fast fourier transform:

$$Z_N(f_D, t) = FFT_{az}(\zeta_N(s, t)) \quad (34)$$

The normalised Doppler spectrum has the energy of the main targets normalised, and only the portion of ambiguous energy remains unchanged. This makes it easier for the detection of ambiguous signatures. The normalised Doppler spectrum is obtained by normalising the data (only in amplitude) in the image domain and then calculating the Doppler spectrum. This operation allows improvement of the detection of ambiguous signals in a scene with strong targets. The suppression may then take place.

Next, at steps 750, 751, 752, and 753, the absolute value of the normalised Doppler spectrum may be analysed to detect the ambiguous signals that follow the equation $$\text{sinc}\left[t - \frac{2R_{res}(f_D)}{c}\right]$$

(i.e. ambiguous signals that depend on range time and azimuth time) using a threshold which may be adaptive, for example according to the spectrum statistical parameters. In the flow of FIG. 7, the amplitude is extracted in step 750, and the Doppler spectrum is averaged in step 751 by using mean convolutional filters:

$$S(f_D, t) = |Z_N(f_D, t)| * h \quad (35)$$

where the absolute value of the normalised Doppler spectrum may be convoluted with an averaging filter h. In step 752, statistical parameters, for example the mean µ and standard deviation σ of $S(f_d, t)$, are used to calculate the adaptive threshold: $T_s = \mu + k \cdot \sigma$ where k is a constant calculated empirically. This may be used to generate a mask for a subsequent thresholding operation on the amplitude data. The statistical parameters may be calculated on the Doppler spectrum in the range $$\left[-\frac{B_D}{2}, +\frac{B_D}{2}\right].$$

$B_D$ is the Doppler band used in this processing. The azimuth ambiguity in the normalised Doppler spectrum may be detected using the following condition:

$$|Z_N(f_D, t)| > T_S \qquad (36)$$

At step 753, a thresholding operation is performed where values above the threshold determined at operation 752 are excluded.

At step 755, for every azimuth column, the fitting of the values of |Z(:, t)| may be calculated by using a polynomial fitting excluding the ambiguous amplitude values. In other words, the ambiguous amplitude values from the normalised Doppler spectrum may be substituted by the fitted function. This operation allows suppression of the ambiguity energy to generate a suppressed amplitude, which may be multiplied by the phase, which is extracted at step 754, of SAR SLC data to obtain the suppressed or filtered Doppler spectrum:

$$Z_{filt}(f_D, t) = |Z(f_D, t)|\exp(j\angle Z(f_D, t)) \qquad (37)$$

In Step 760, the suppressed Doppler spectrum may then be inverse Fast Fourier transformed in with respect to azimuth time to obtain the following the suppressed or filtered SAR SLC data represented by:

$$\zeta_{filt}(s, t) = IFFT_{az}(Z_{filt}(f_D, t)) \qquad (38)$$

In step 765, an azimuth ambiguity map AASR (s,t) is generated based on the filtered SLC data. As with step 730, the AASR map may be generated using the PVA algorithm. Other detection algorithms could also be used in place of the PVA algorithm to generate the AASR map or other map that indicates where ambiguities are present in the image data, and from which the percentage of the image that contains ambiguities can be calculated.

At step 770, the filtered AASR map generated at step 765 is compared to the AASR reference map generated at step 730. If the comparison meets predetermined criteria, for example the difference between the two, the detection and suppression algorithm can be iteratively performed on the Filtered SLC data $\zeta_{filt}(s, t)$ from step 760 by sending it back to step 720 until the filtering is not producing a decreasing of AASR calculated with the PVA detection algorithm, or until a maximum number of iterations $N_{max}$ has been reached. At that point, the Filtered SLC data is passed through to step 780 and the azimuth suppression algorithm according to this example is complete. The Filtered SLC data can then be formed into an image (with ambiguities suppressed) or used in other ways.

As with step 730, the generation of the ambiguity map in step 765 along with the comparison operation in step 770 are optional steps used in testing the effectiveness of the suppression method and do not necessarily form part of the suppression method. If no comparison is desired, the Filtered SLC generated in step 760 can be passed straight through to step 780 at the end of the algorithm.

In summary, the criteria for determining whether to perform a repeat iteration may be comparative, such as an improvement in ambiguity suppression as compared to the previous iteration, or absolute such as meeting an ambiguity threshold, or a combination of these criteria. Other suitable quality criteria will be known to those skilled in the art.

It will be noted that in the suppression method described with reference to FIG. 7 a thresholding or segmentation operation may be performed at every iteration of the suppression method, whereas in the stand-alone detection method described with reference to FIG. 4 it may occur only once. In the specific example of FIG. 7 the PVA algorithm (and the associated thresholding) are run multiple times to generate the AASR reference map (step 765) as well as to generate the AASR filtered map (step 730).

Figure 8:
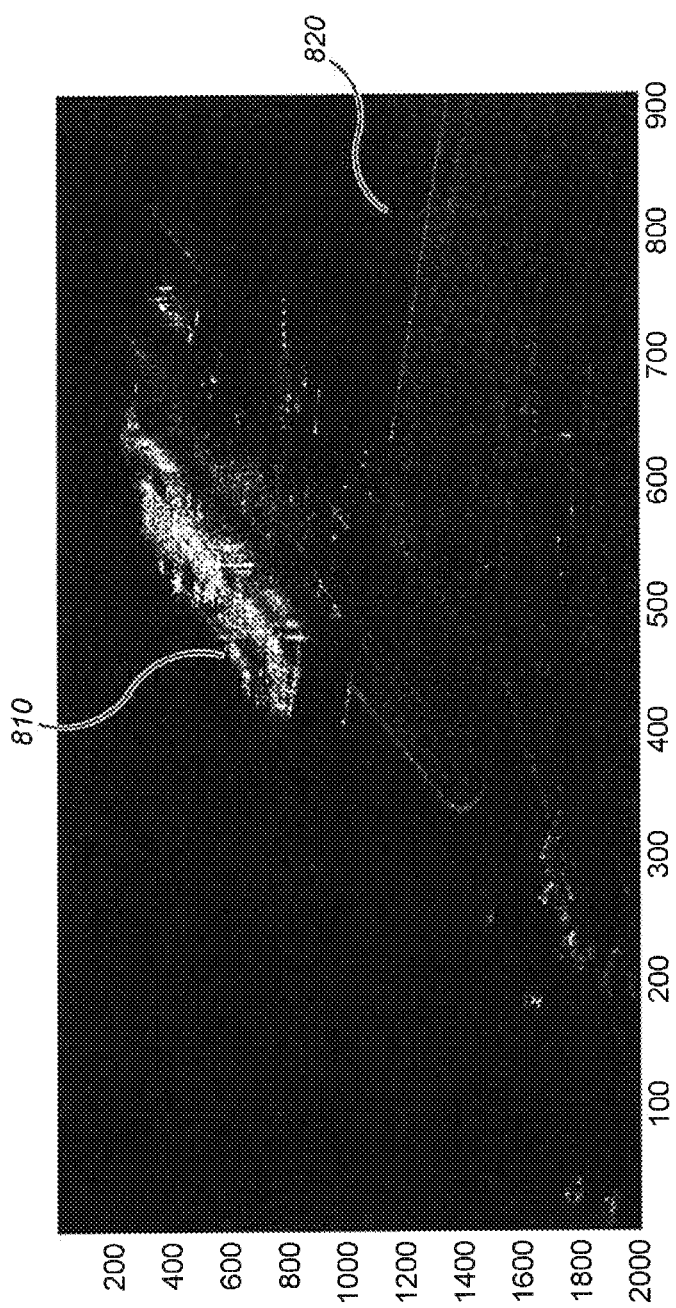
FIG. 8 shows an image of a ship including ambiguities.
Figure 9A:
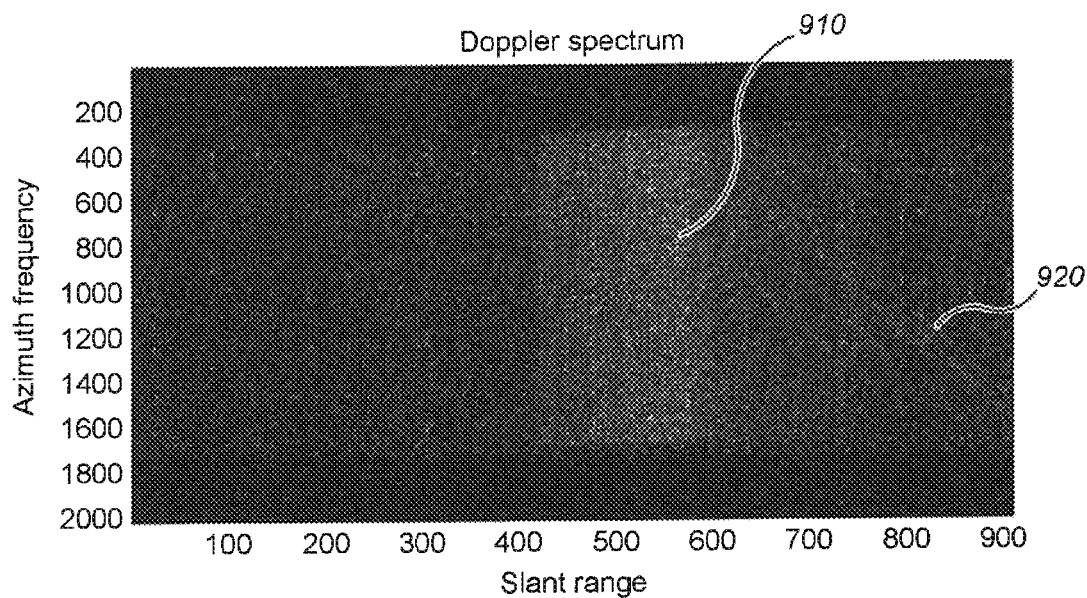
FIGS. 9a and 9b show respectively the Doppler spectrum of the image in FIG. 10, and the Doppler spectrum after normalization according to some embodiments of the invention.
Figure 9B:
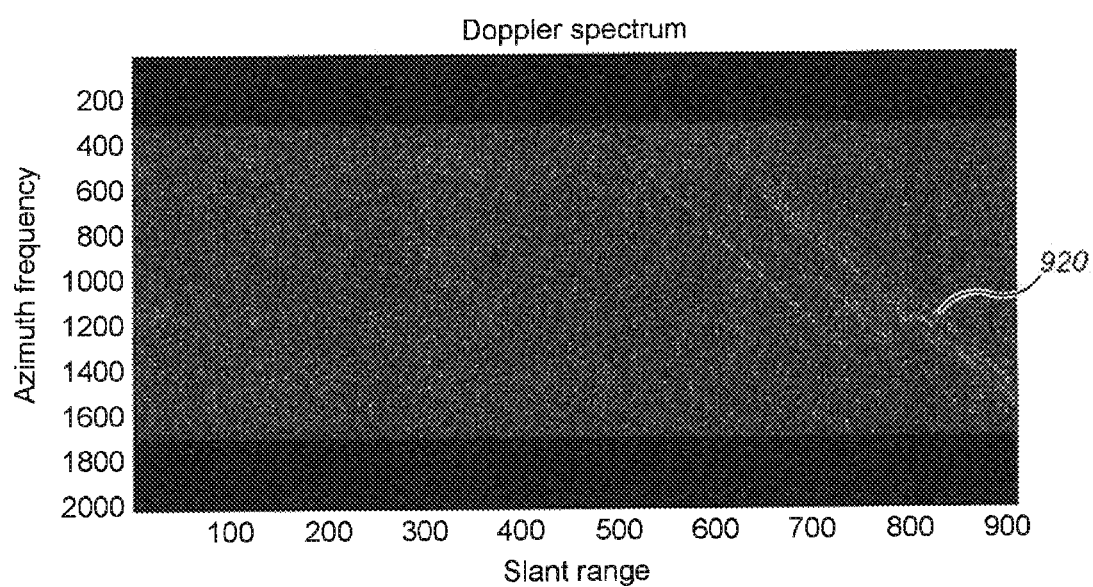

To illustrate how the SDFS algorithm works FIG. 8 shows an image of a ship 810 and includes ambiguities 820 which can be seen to the right of the image. FIG. 9a shows the Doppler spectrum of the image data of FIG. 8, with the main target represented by the straight lines 910 in the middle and the ambiguous energy represented by the skew lines 920 at the right. FIG. 9b shows the Doppler spectrum after the normalization, which has the effect of decreasing the power of the main target. Here the ambiguous energy 920, some of which was previously masked by the main target, is more visible and is more easily detected.

The SDFS algorithms have been tested and validated by using simulated and real data. The following will show the performance metrics calculated on simulations and the results obtained on real data.

The SDFS algorithm provides a light and efficient method of ambiguity suppression, and is demonstrated to work well even if the ambiguity is weak. In presence of strong targets as in the urban environment it can fail if the ambiguous energy is masked by the target energy. The PVA algorithm has been used for the calculation of the performance metrics. The performances are calculated on the dataset of simulations that the PVA algorithm detected as ambiguities; the ambiguities that were not detected by the PVA algorithm do not contribute to the performance calculation.

Table 2 shows the performances of the ambiguity suppression; the suppression rate in frequency corresponds to the ambiguous spectral signature energy that is suppressed, the false positive suppression in frequency refers to the non-ambiguous spectrum that is wrongly suppressed and the suppression rate in image is the amount of ambiguity that is suppressed in the image.

TABLE 2

| Ambiguity order | Suppress rate in frequency [%] | False positive suppression in frequency [%] | Suppression rate in image [%] |
|---|---|---|---|
| 1 | 72.87 | 0.74 | 59 |
| 2 | 86.38 | 0.66 | 71.72 |
| TOT | 81.04 | 0.68 | 67.33 |

The difference of results between ambiguities of first and second order is due to two main contributions. On one side, the first order ambiguity has a SCR higher than the second order ambiguity, because the second sidelobes have lower energy. On the other side, the second order ambiguity has higher residual range migration, increasing the sensitivity to detect range-azimuth dependent signatures. The percentage of the spectrum that is wrongly suppressed as ambiguity is lower than 1% in any case.

Figure 10:
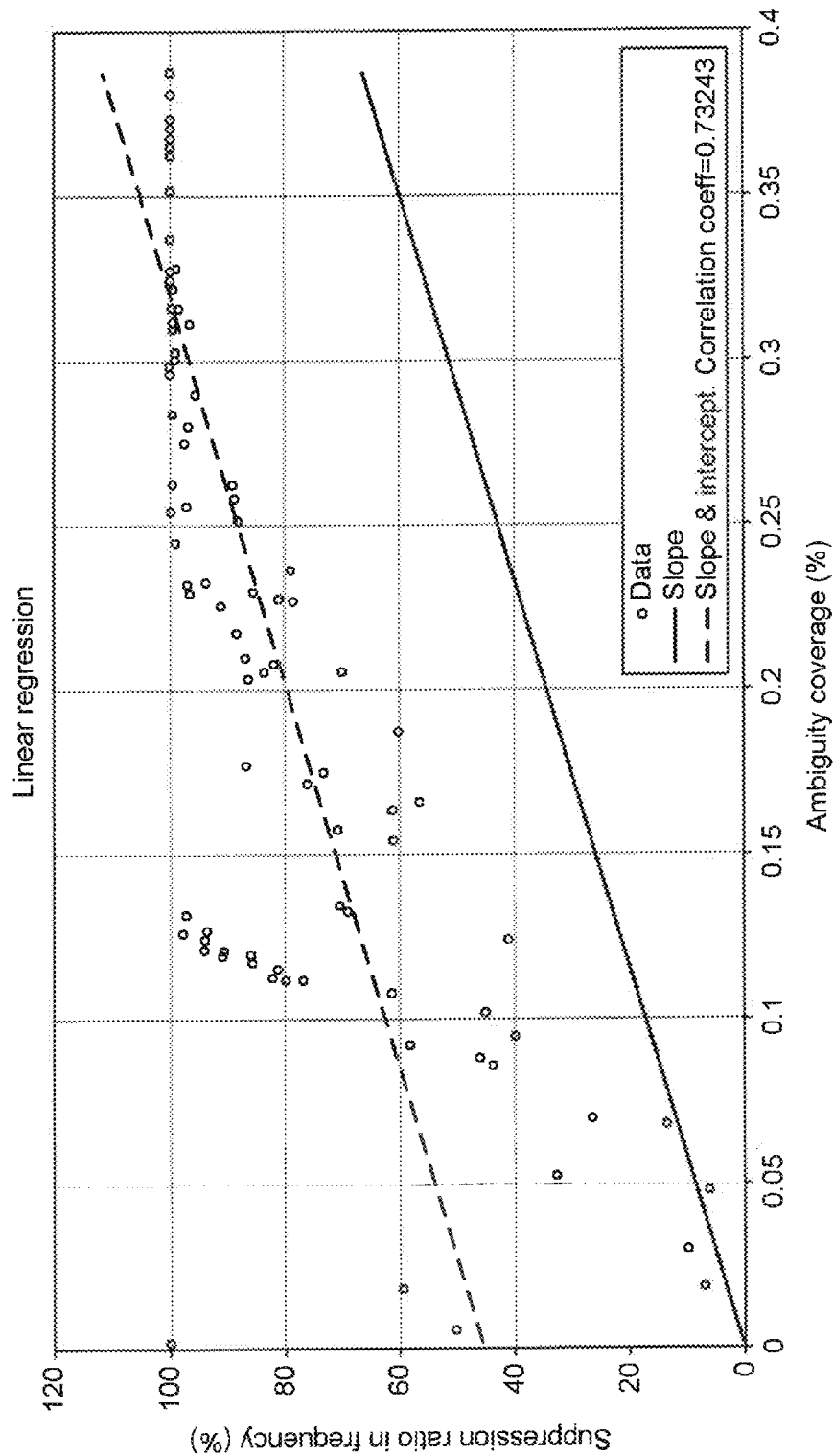
FIG. 10 illustrates a plot of linear regression between the suppression rate and the ambiguity coverage.

FIG. 10 shows graph of percentage suppression rate in frequency vs percentage ambiguity coverage. A linear regression between the suppression rate and the ambiguity coverage is shown. A low ambiguity coverage means there are only very small and/or very few ambiguities in the image, whereas a higher ambiguity coverage means there are either more or larger ambiguities in the image. As can be seen from FIG. 10, the main contribution of the suppression rate is the ambiguity coverage in the image. It is harder to accurately detect and suppress the ambiguities if the ambiguity coverage is too low. However, if the ambiguity coverage is higher than 0.1% of the analysed area then the performances of the SDFS algorithm increase. Above a percentage ambiguity coverage of approximately 0.3%, the suppression rate approaches 100%.

Figure 11B:
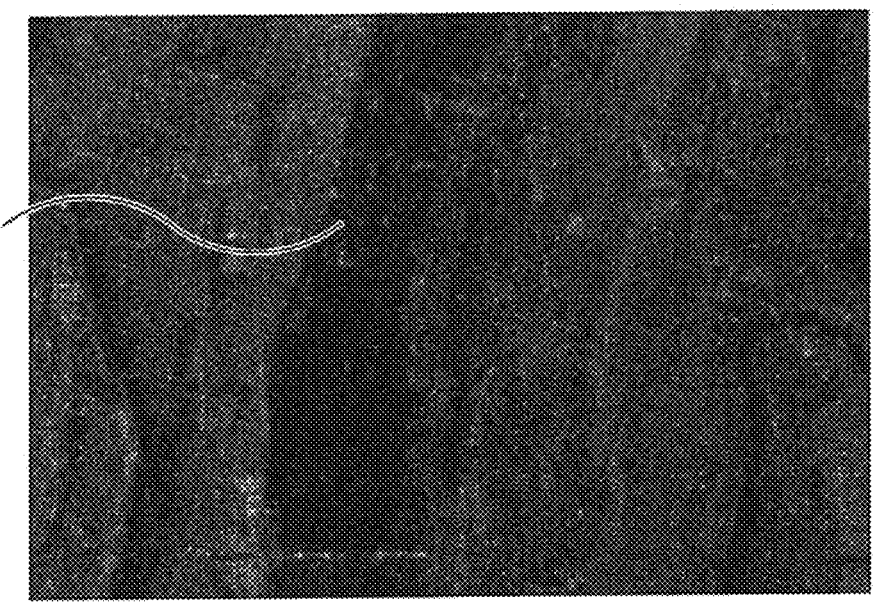
FIGS. 11a and 11b show a strip map image with azimuth ambiguities before and after detection and suppression using the SDFS method.
Figure 11A:
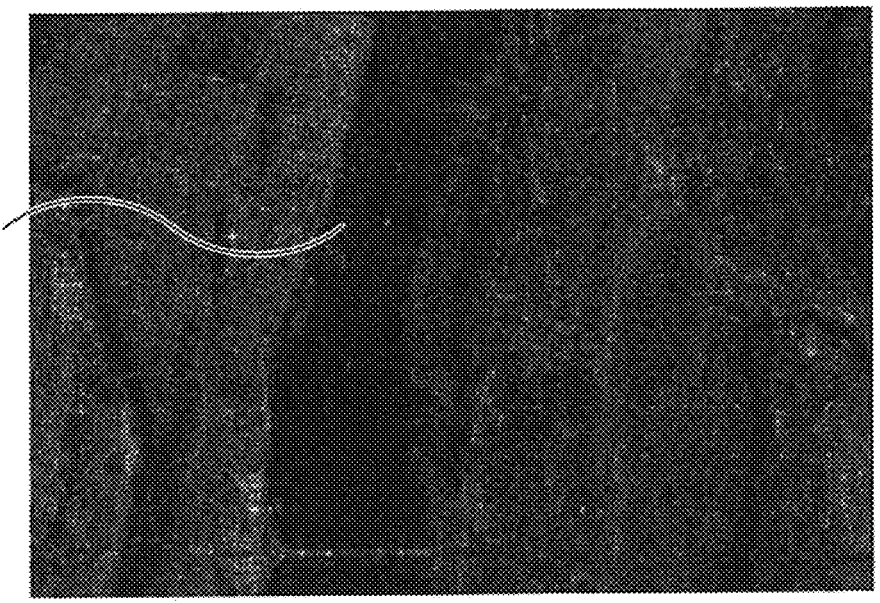

The SDFS algorithms have also been tested on real images. FIG. 11a shows a SAR image of a city with a river running through it taken using the strip map imaging mode. Ambiguities 1110 are clearly visible in the river. FIG. 11b shows the same image after the SDFS algorithm has been run on the SAR SLC data that was used to generate the image. It can be seen that some of the ambiguities at 1120 have been suppressed. Rerunning the algorithm iteratively may help to further suppress the ambiguities, up until the point that no further improvement can be achieved.

Figure 12A:
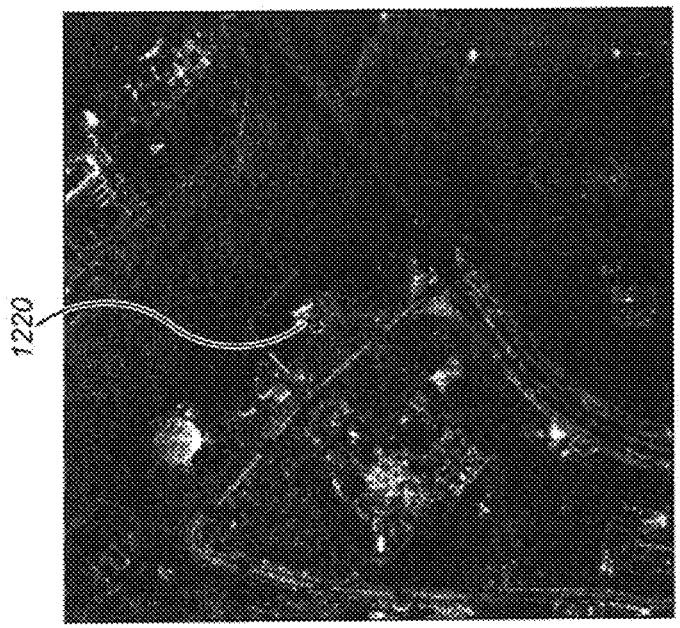
FIGS. 12a and 12b show a spotlight image with azimuth ambiguities before and after suppression using the SDFS method.
Figure 12B:
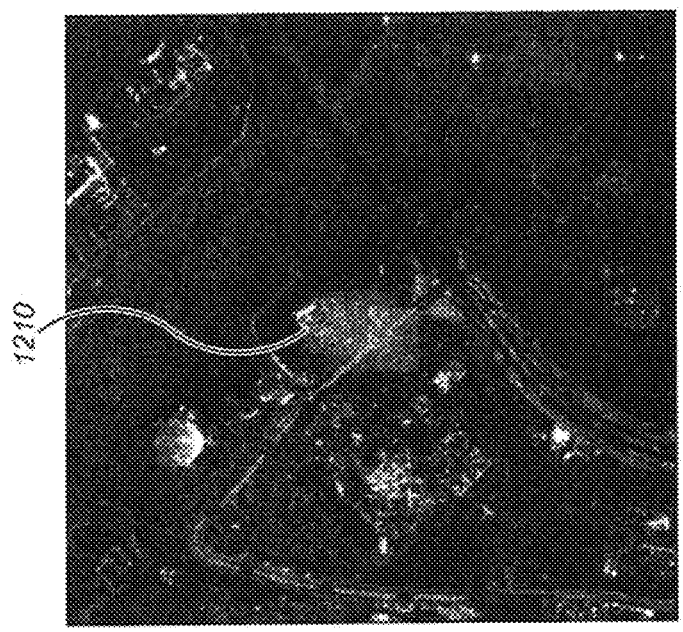

Similarly, FIG. 12a shows a scene taken using spotlight mode with a large and clear ambiguity located at 1210. FIG. 12b shows the results of ambiguity suppression. As can be seen at 1220, the ambiguity has been quite effectively suppressed by the SDFS algorithm.

The SDFS algorithm for azimuth ambiguity detection and suppression achieved very good results in simulated and real data. The implemented algorithm solves the problem of the ambiguity suppression with a light and easy technique. The ambiguity suppression is performed with an algorithm that does not reduce the resolution, preserves the phase and can work also when the ambiguous signature cannot be easily decoupled from the main signal. The advantages of the SDFS algorithm are the processing speed and the independence on specific models. Moreover, the algorithm is able to suppress signals that are not properly decoupled from the main signal, and the phase is preserved after the suppression. Its limitations are the sensitiveness to the configuration parameters and the suppression of useful signal in some conditions.

The Phase Variant Analysis (PVA) method of ambiguity detection and the Selective Doppler Frequency Suppression (SDFS) method for detecting and suppressing azimuth ambiguities described in this disclosure can both be used independently. However, they can also be used together in a synergistic manner. As mentioned previously the effectiveness of the SDFS suppression may be determined by detecting ambiguities in the azimuth ambiguity suppressed image data using the PVA method.

As noted above, in an alternative example of determining the effectiveness of the suppression, step 770 in FIG. 7, the suppressed SAR SLC data may be compared with a threshold. If the suppressed SAR SLC data is less than or equal to an AASR threshold, for example a total energy threshold for the whole image, then no further processing is done. However, if the suppressed SAR SLC data exceeds AASR, then the SDFS algorithm is repeated on the azimuth ambiguity suppressed image data until the suppressed SAR SLC data is equal to or below the AASR. Alternatively, operations 720 to 770 may be repeated until a maximum number, $N_{max}$, of iterations have been reached.

Figure 13:
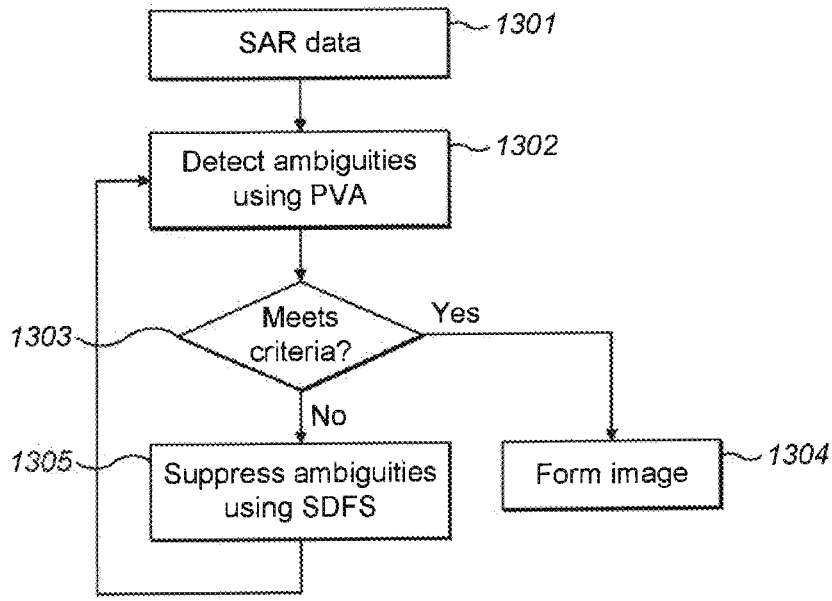
FIG. 13 is a flowchart illustrating the use of the PVA algorithm to detect ambiguities combined with the SDFS algorithm to detection and suppress them.

FIG. 13 shows how the detection and suppression methods described here, such as the PVA and SDFS, may be used together synergistically in order to improve the quality of a SAR image. Starting with SAR data in step 1301, the PVA algorithm can be used in step 1302 to detect if there are any ambiguities in the image. If the level of ambiguities is low enough to meet the predetermined criteria, as indicated by the decision at step 1303, then the image can be formed in step 1304. For example, a predetermined criterion may be a total ambiguous energy threshold determined using the one or more phase derivative values described here. If the level of ambiguities is higher than the predetermined criteria, the SDFS algorithm can be used in step 1305 to detect and suppress azimuth ambiguities in the Doppler spectrum.

Once this is done, the new image with suppressed ambiguities can once again be fed into the PVA algorithm at step 1302 in order to determine if the criteria is met. This process occurs iteratively until either the image criteria are met, or no further improvements are detected, or a certain maximum number of iterations is reached (the checks for the last two conditions are not shown in FIG. 13).

In an example, the method of FIG. 13 can also be implemented using the PVA algorithm in step 1302 and a different suppression algorithm in step 1305. Similarly, in another example the method can be implemented with a different ambiguity detection method in step 1302 and with the SDFS algorithm for detecting and suppressing ambiguities in step 1305.

The processing of SAR data to detect and/or suppress azimuth ambiguities may be performed onboard a satellite or at a ground station depending on available computing power. Further, operations described here may be performed in a distributed computing system which may or may not include a computing system onboard a satellite. Therefore some embodiments of the invention described here provide a computing system configured to operate a SAR according to any of the methods described here, an example of which is illustrated in FIG. 14.

In any of the embodiments of the invention, the satellite may be travelling in, or configured to travel in a low earth orbit.

Figure 14:
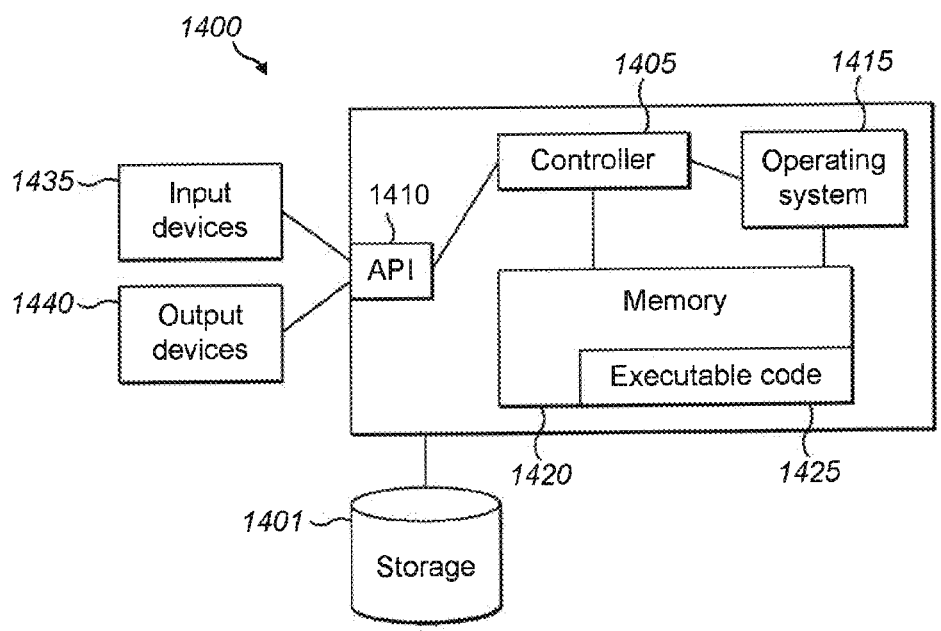
FIG. 14 is a block diagram of a computing system which may be used to implement any of the methods described here.

A computing system which may be used in the implementation of any of the methods described here is shown schematically in FIG. 14.

Computing system 1400 may comprise a single computing device or components such as a laptop, tablet, desktop or other computing device. Alternatively functions of system 1400 may be distributed across multiple computing devices.

Computing system 1400 may include one or more controllers such as controller 1405 that may be, for example, a central processing unit processor (CPU), a chip or any suitable processor or computing or computational device such as the FPGA mentioned above, an operating system 1415, a memory 1420 storing executable code 1425, storage 1430 which may be external to the system or embedded in memory 1420, one or more input devices 1435 and one or more output devices 1440.

One or more processors in one or more controllers such as controller 1405 may be configured to carry out any of the methods described here. For example, one or more processors within controller 1405 may be connected to memory 1420 storing software or instructions that, when executed by the one or more processors, cause the one or more processors to carry out a method according to some embodiments of the present invention. Controller 1405 or a central processing unit within controller 1405 may be configured, for example, using instructions stored in memory 1425, to perform some of the operations shown in FIGS. 4, 7, and 8.

SAR data may be received at a processor comprised in the controller 1405 which then controls the subsequent operations of FIGS. 4, 7 and 8 according to one or more algorithms which may be stored as part of the executable code 1425.

Input devices 1435 may be or may include a mouse, a keyboard, a touch screen or pad or any suitable input device. It will be recognized that any suitable number of input devices may be operatively connected to computing system 1400 as shown by block 1435. Output devices 1440 may include one or more displays, speakers and/or any other suitable output devices. It will be recognized that any suitable number of output devices may be operatively connected to computing system 1400 as shown by block 1440. The input and output devices may, for example, be used to interact with the computing system through an applications programming interface, API 1410, to enable a user to select information, e.g., images and graphs as shown here, to be displayed.

Any of the computing systems described here may be combined in a single computing system with multiple functions. Similarly, the functions of any of the computing systems described herein may be distributed across multiple computing systems.

Some operations of the methods described herein may be performed by software in machine readable form e.g., in the form of a computer program comprising computer program code. Thus some aspects of the invention provide a computer readable medium which when implemented in a computing system cause the system to perform some or all of the operations of any of the methods described herein. The computer readable medium may be in transitory or tangible (or non-transitory) form such as storage media include disks, thumb drives, memory cards etc. The software can be suitable for execution on a parallel processor or a serial processor such that the method operations may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The embodiments described above are largely automated. In some examples a user or operator of the system may manually instruct some operations of the method to be carried out.

In the described embodiments of the invention the ground station may comprise such a computing and/or electronic system such as described with reference to FIG. 14.

The term "computing system" is used herein to refer to any device with processing capability such that it can execute instructions. Those skilled in the art will realise that such processing capabilities may be incorporated into many different devices and therefore the term "computing system" includes PCs, servers, smart mobile telephones, personal digital assistants and many other devices.

It will be understood that the benefits and advantages described above may relate to one embodiment or may relate to several embodiments. The embodiments are not limited to those that solve any or all of the stated problems or those that have any or all of the stated benefits and advantages.

Any reference to "an" item or "piece" refers to one or more of those items unless otherwise stated. The term "comprising" is used herein to mean including the method operations or operations or elements identified, but that such operations or operations or elements do not comprise an exclusive list and a method or apparatus may contain additional operations or operations or elements.

Further, to the extent that the term "includes" is used in either the detailed description or the claims, such term is intended to be inclusive in a manner similar to the term "comprising" as "comprising" is interpreted when employed as a transitional word in a claim.

The figures illustrate exemplary methods. While the methods are shown and described as being a series of acts that are performed in a particular sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

The order of the operations or operations of the methods described herein is exemplary, but the operations or operations may be carried out in any suitable order, or simultaneously where appropriate. Additionally, operations or operations may be added or substituted in, or individual operations or operations may be deleted from any of the methods without departing from the scope of the subject matter described herein. Aspects of any of the examples described above may be combined with aspects of any of the other examples described to form further examples.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

Aspects of the disclosure are set out in the following numbered clauses:

1. A computer-implemented method for detecting ambiguities in synthetic aperture radar (SAR) image data wherein the SAR data comprises, for each pixel in an image, an amplitude and a phase value, the method comprising:
    calculating at least one phase derivative value for respective pixels represented by the SAR data with respect to a spatial direction,
    determining a threshold for the phase derivative value, and
    determining pixels with phase derivative values above the threshold to be ambiguous.
2. The method of clause 1 wherein calculating at least one phase derivative value comprises calculating a phase derivative value with respect to azimuth.

3. The method of clause 1 or clause 2 wherein calculating at least one phase derivative value comprises calculating a phase derivative value with respect to range.

4. The method of clause 1, 2 or 3 wherein calculating at least one phase derivative value comprises calculating phase derivative values with respect to range and azimuth, wherein the threshold is determined from a combination of the phase derivative values.

5. The method of clause 4 wherein the threshold is determined from the product of the phase derivative values.

6. The method of any preceding clause wherein the calculation of the at least one phase derivative value is performed on a subset of the image data.

7. The method of any preceding clause comprising filtering the image data to reduce sidelobes prior to calculating the one or more phase derivative values.

8. The method of clause 6 comprising generating a Doppler spectrum of the image data, wherein the filtering is performed on the Doppler spectrum.

9. The method of any preceding clause wherein the data comprises single look data.

10. The method of clause 8 comprising weighting the one or more phase derivative values by a by a factor depending on difference between range looks, wherein the threshold is applied to the weighted phase derivative values.

11. The method of clause 9, wherein the difference between range looks is calculated using a first and a second sub-aperture.

12. The method of clause 10, wherein the first and the second sub-aperture, are symmetrical.

13. The method of clause 12 wherein the first and second sub-apertures respectively, select the first 50% of the SAR SLC data and the last 50% of the SAR SLC data, and wherein the first and the second sub-apertures are symmetrical.

14. The method of any preceding clause comprising shifting the data to a Doppler centroid prior to calculating the at least one phase derivative value.

15. The method of any preceding clause comprising generating an ambiguity map corresponding to the image based on the at least one phase derivative value.

16. The method of any preceding clause comprising segmenting the phase derivative values to generate a mask corresponding to the image.

17. The method of any preceding clause comprising normalising the data to attenuate spectral signatures that are dependent only on the azimuth prior to calculating the at least one phase derivative value.

18. The method clause 16, wherein segmenting the phase derivative values to generate a mask comprises using a threshold.

19. The method of any preceding clause performed on data that has been compensated for range migration.

20. The method of any preceding clause performed on data that has been processed to form a SAR image.

21. The method of any preceding clause further comprising suppressing ambiguities in the synthetic aperture radar (SAR) image data.

22. The method of clause 21 wherein the suppressing ambiguities in the synthetic aperture radar (SAR) image data comprises:
generating a Doppler spectrum of the image data
applying an amplitude threshold to the Doppler spectrum of the image data to exclude values above the threshold resulting from ambiguous energy in the spectrum, and
substituting the excluded amplitude values to generate a modified Doppler spectrum with the ambiguous energy suppressed; and
generating azimuth ambiguity suppressed image data using the modified Doppler spectrum.

23. A computing system comprising one or more processors configured to perform a method according to any preceding clause.

24. A computer-readable medium comprising instructions which, when executed in a computing system, cause the computing system to carry out the method of any of clauses 1 to 22.

25. A computer-implemented method for suppressing azimuth ambiguities in synthetic aperture radar "SAR" single look complex image data, wherein the data comprises a Doppler spectrum obtained from received SAR signals, the method comprising:
applying an amplitude threshold to the Doppler spectrum of received SAR signals to exclude values above the threshold resulting from ambiguous energy in the spectrum, and
substituting the excluded amplitude values to generate a modified Doppler spectrum with the ambiguous energy suppressed; and
generating azimuth ambiguity suppressed image data using the modified Doppler spectrum.

26. The method of clause 25 wherein the amplitude threshold is an adaptive threshold based on statistical parameters of the Doppler spectrum.

27. The method of clause 25 or clause 26 wherein the Doppler spectrum is obtained by normalising the SAR data in the image domain in amplitude only and calculating the Doppler spectrum based on the normalised data.

28. The method of clause 27 comprising shifting the data to a Doppler centroid, wherein the normalising comprises normalising the shifted SAR SLC data to attenuate spectral signatures that are dependent only on the azimuth.

29. The method of any preceding clause wherein the substituting is performed using a fitting function.

30. The method of any preceding clause comprising detecting ambiguities in the azimuth ambiguity suppressed image data and if the amount of ambiguities fails to satisfy predetermined criteria performing the steps of any preceding clause on the azimuth ambiguity suppressed image data.

31. The method of clause 30 wherein the predetermined criteria comprise an ambiguous energy threshold.

32. The method of clause 30 or clause 31 wherein the predetermined criteria comprise an improvement in ambiguity suppression compared to the SLC data on which the suppression was performed.

33. The method of clause 30, 31 or 32 wherein the detecting ambiguities comprises: calculating at least one phase derivative value for respective pixels represented by the SAR data with respect to a spatial direction, determining a threshold for the phase derivative value, and determining pixels with phase derivative values above the threshold to be ambiguous.

34. The method of clause 33 wherein calculating at least one phase derivative value comprises calculating a phase derivative value with respect to azimuth.

35. The method of clause 33 or clause 34 wherein calculating at least one phase derivative value comprises calculating a phase derivative value with respect to range.

36. The method of clause 33, 34 or 35 wherein calculating at least one phase derivative value comprises calculating phase derivative values with respect to range and azimuth, wherein the threshold is determined from a combination of the phase derivative values.

37. The method of clause 36 wherein the threshold is determined from the product of the phase derivative values.

38. The method of any of clauses 33 to 37 wherein the calculation of the at least one phase derivative value is performed on a subset of the image data.

39. The method of any of clauses 33 to 37 comprising filtering the image data to reduce sidelobes prior to calculating the one or more phase derivative values.

40. The method of clause 38 comprising generating a Doppler spectrum of the image data, wherein the filtering is performed on the Doppler spectrum.

41. The method of any of clauses 33 to 40 comprising weighting the one or more phase derivative values by a by a factor depending on difference between range looks, wherein the threshold is applied to the weighted phase derivative values.

42. The method of clause 41, wherein the difference between range looks is calculated using a first and a second sub-aperture.

43. The method of clause 42, wherein the first and the second sub-aperture, are symmetrical.

44. The method of clause 43 wherein the first and second sub-apertures respectively, select the first 50% of the SAR SLC data and the last 50% of the SAR SLC data, and wherein the first and the second sub-apertures are symmetrical.

45. The method of any of clauses 33 to 44 comprising shifting the data to a Doppler centroid prior to calculating the at least one phase derivative value.

46. The method of any of clauses 33 to 44 comprising generating an ambiguity map corresponding to the image based on the at least one phase derivative value.

47. The method of any of clauses 33 to 44 comprising segmenting the phase derivative values to generate a mask corresponding to the image.

48. The method of any of clauses 25 to 47 wherein generating azimuth ambiguity suppressed image data using the modified Doppler spectra comprises multiplying the modified Doppler spectrum by the phase of the input data and inverse transforming the Doppler spectrum with respect to azimuth.

49. A computing system comprising one or more processors configured to perform the method of any of clauses 25 to 48.

50. A computer-readable medium comprising instructions which, when executed in a computing system, cause the computing system to carry out the method of any of clauses 25 to 48.

What is claimed is:

1. A computer-implemented method of suppressing azimuth ambiguities in synthetic aperture radar (SAR) single look complex (SLC) image data (SAR SLC image data), wherein the SAR SLC image data comprises a Doppler spectrum obtained from received SAR signals, the method comprising:

generating the Doppler spectrum from the SAR SLC image data;

applying an amplitude threshold to the Doppler spectrum to exclude amplitude values above the amplitude threshold resulting from ambiguous energy in the Doppler spectrum, and substituting the excluded amplitude values using a fitting function to generate a modified Doppler spectrum with the ambiguous energy suppressed; and generating azimuth ambiguity suppressed image data using the modified Doppler spectrum.

2. The method of claim 1, wherein the amplitude threshold is an adaptive threshold based on statistical parameters of the Doppler spectrum.

3. The method of claim 1, wherein generating the Doppler spectrum comprises (a) normalising the SAR SLC image data in amplitude only and generating normalised data and (b) calculating the Doppler spectrum based on the normalised data.

4. The method of claim 3, comprising shifting the SAR SLC image data to a Doppler centroid and generating shifted SAR SLC image data, wherein the normalising of the SAR image data comprises normalising the shifted SAR SLC image data to attenuate spectral signatures that are dependent only on the azimuth.

5. The method of claim 1, comprising detecting ambiguities in the azimuth ambiguity suppressed image data and if an amount of detected ambiguities fails to satisfy predetermined criteria, performing the steps of:

generating a second Doppler spectrum from azimuth ambiguity suppressed image data;

applying a second amplitude threshold to the second Doppler spectrum of the azimuth ambiguity suppressed image data to exclude amplitude values above the second amplitude threshold resulting from ambiguous energy in the second Doppler spectrum, and substituting the excluded amplitude values using a fitting function to generate a second modified Doppler spectrum with the ambiguous energy suppressed; and generating an additional azimuth ambiguity suppressed image data using the second modified Doppler spectrum.

6. The method of claim 5, wherein the predetermined criteria comprise a total ambiguous energy threshold.

7. The method of claim 5, wherein the predetermined criteria comprise an improvement in ambiguity suppression compared to the SAR SLC image data on which the suppression was performed.

8. The method of claim 5, wherein the detecting of ambiguities comprises: calculating at least one phase derivative value for respective pixels represented by the SAR SLC image data with respect to a spatial direction, determining a phase derivative threshold for the phase derivative value, and determining pixels with phase derivative values above the phase derivative threshold to be ambiguous.

9. The method of claim 8, wherein the calculating of at least one phase derivative value comprises calculating a phase derivative value with respect to azimuth.

10. The method of claim 8, wherein the calculating of at least one phase derivative value comprises calculating a phase derivative value with respect to range.

11. The method of claim 8, wherein calculating of at least one phase derivative value comprises calculating phase derivative values with respect to range and azimuth, wherein the phase derivative threshold is determined from a combination of the phase derivative values.

12. The method of claim 11, wherein the phase derivative threshold is determined from the product of the phase derivative values.

13. The method of claim 8, wherein the calculation of the at least one phase derivative value is performed on a subset of the SAR SLC image-data.

14. The method of claim 8, comprising filtering the SAR SLC image data to reduce sidelobes prior to the calculating of the one or more phase derivative values.

15. The method of claim 8, comprising weighting the one or more phase derivative values by a by a factor depending on a difference between range looks, wherein the phase derivative threshold is applied to the weighted phase derivative values.

16. The method of claim 15, wherein the difference between range looks is calculated using a first and a second sub-aperture.

17. The method of claim 16, wherein the first and the second sub-aperture, are symmetrical.

18. The method of claim 17, wherein;
the first and second sub-apertures are, respectively, selected from a first 50% of the SAR SLC image data and a last 50% of the SAR SLC image data, and
the first and the second sub-apertures are symmetrical.

19. A computing system comprising one or more processors configured to perform the method of claim 1.

20. A non-transitory computer-readable storage medium comprising instructions which, when executed in a computing system, cause the computing system to carry out the method of claim 1.

* * * * *